(12) United States Patent
Hashimoto

(10) Patent No.: US 7,239,097 B2
(45) Date of Patent: Jul. 3, 2007

(54) VEHICLE-MOUNTED DRIVE CONTROL APPARATUS

(75) Inventor: Koji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/432,310

(22) Filed: May 12, 2006

(65) Prior Publication Data

US 2007/0114956 A1  May 24, 2007

(30) Foreign Application Priority Data

Nov. 18, 2005  (JP) ............................ P2005-334506

(51) Int. Cl.
*H02P 1/00* (2006.01)

(52) U.S. Cl. .................... 318/139; 318/432; 318/434; 318/254

(58) Field of Classification Search ................ 318/254, 318/138, 439, 432, 434, 139
See application file for complete search history.

(56) References Cited

U.S. PATENT DOCUMENTS

| | | | | |
|---|---|---|---|---|
| 4,821,590 A | * | 4/1989 | Tury et al. ..................... | 74/335 |
| 5,057,764 A | * | 10/1991 | Fujimoto et al. ............. | 322/14 |
| 5,190,009 A | | 3/1993 | Kadota | |
| 6,491,022 B2 | * | 12/2002 | Okamoto ..................... | 123/396 |
| 6,781,341 B2 | * | 8/2004 | Nakamichi et al. ......... | 318/685 |
| 2002/0157313 A1 | | 10/2002 | Fukazawa et al. | |
| 2003/0100975 A1 | | 5/2003 | Hashimoto et al. | |

FOREIGN PATENT DOCUMENTS

| | | |
|---|---|---|
| JP | 5-18315 A | 1/1993 |
| JP | 11-089268 A | 3/1999 |
| JP | 2000-236685 A | 8/2000 |
| JP | 2000-274140 A | 10/2000 |
| JP | 2003-161194 A | 6/2003 |

* cited by examiner

*Primary Examiner*—Rina Duda
(74) *Attorney, Agent, or Firm*—Sughrue Mion, PLLC

(57) ABSTRACT

A vehicle-mounted drive control apparatus capable of effecting boosted escape running while preventing burnout when a reversible motor driven by way of a transistor bridge circuit encounters an abnormal load. A motor driven by a transistor bridge circuit reversibly drives a moving body between a reverse limit stopper and a forward limit stopper. A variable resistance produces an output signal related to the position of the moving body, and calibration information is read at the positions of the reverse limit position and forward limit position and saved from a microprocessor to a non-volatile data memory in advance. When during normal drive running of the motor the motor stops at an intermediate position between the forward limit stopper and the reverse limit stopper, escape drive is carried out by the motor being driven alternately with a boosted current above its rated current and a resting current which is small or 0.

24 Claims, 22 Drawing Sheets

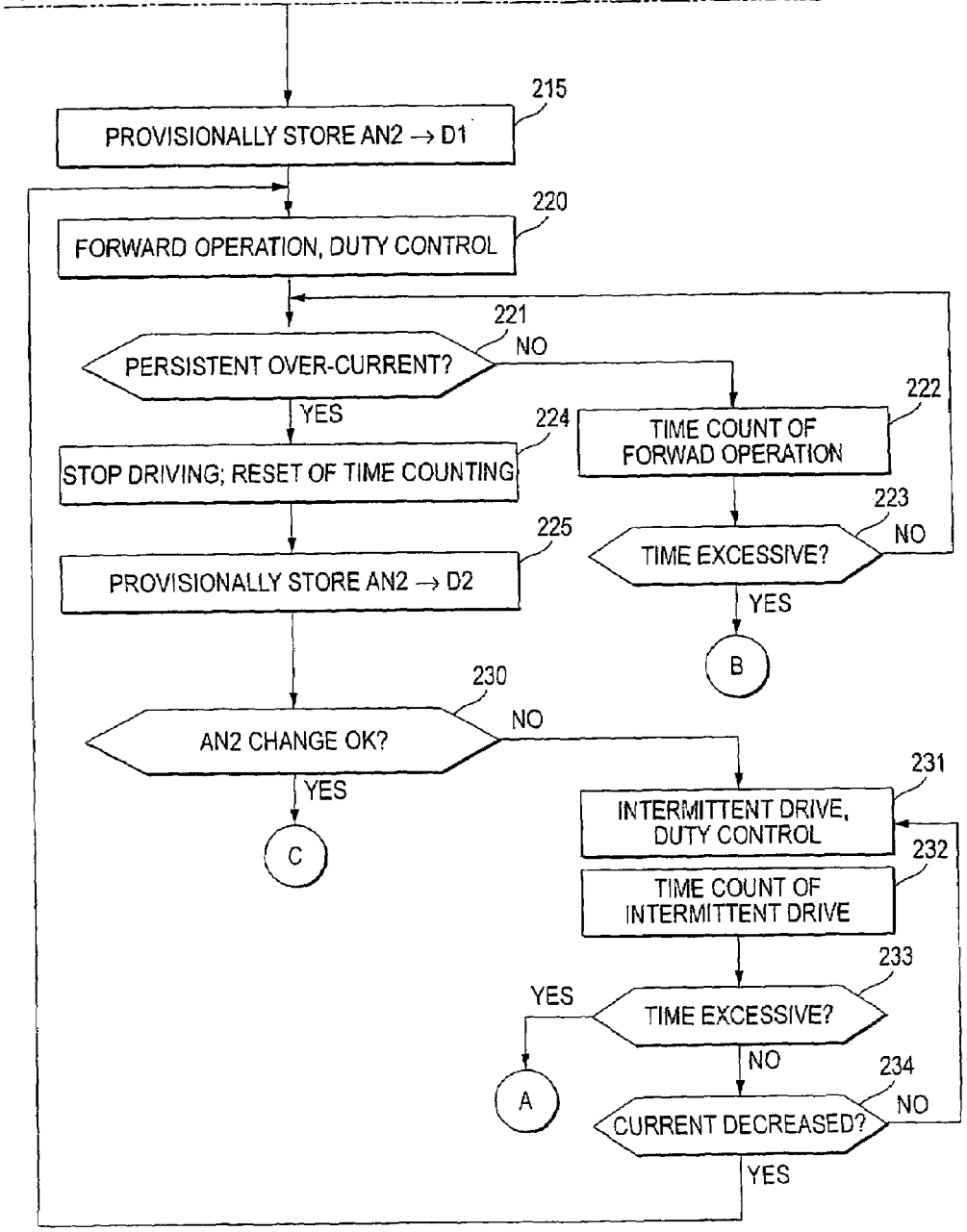

(FIG.2 CONTINUED)
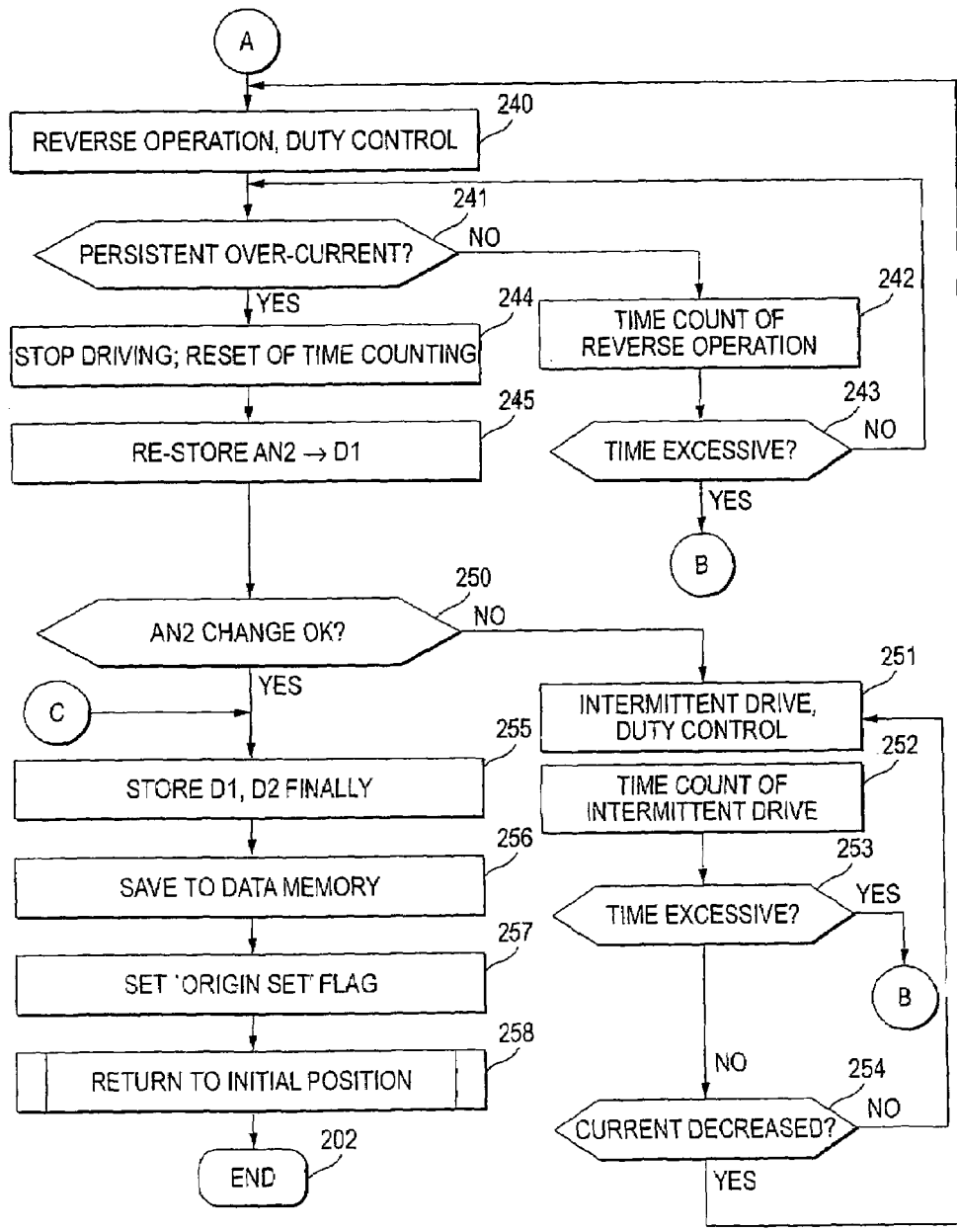
(CONT.)

(FIG.2 CONTINUED)
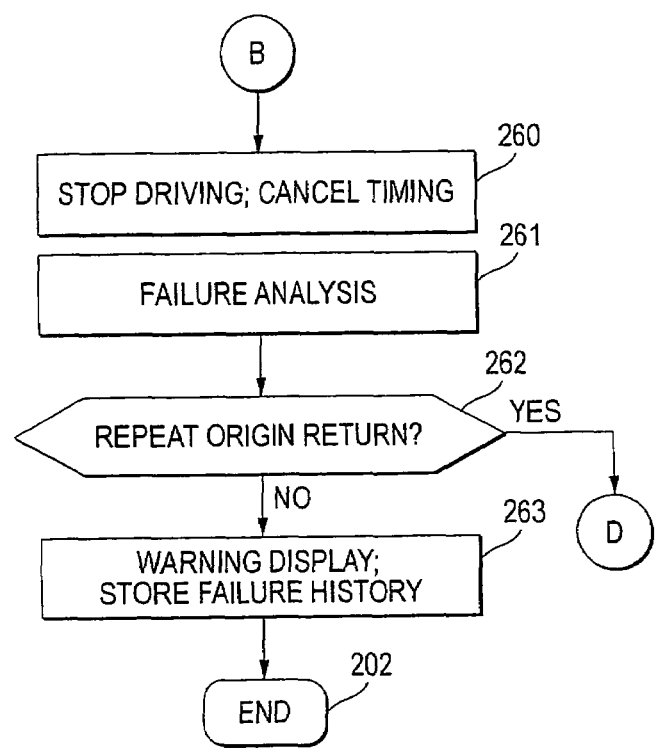

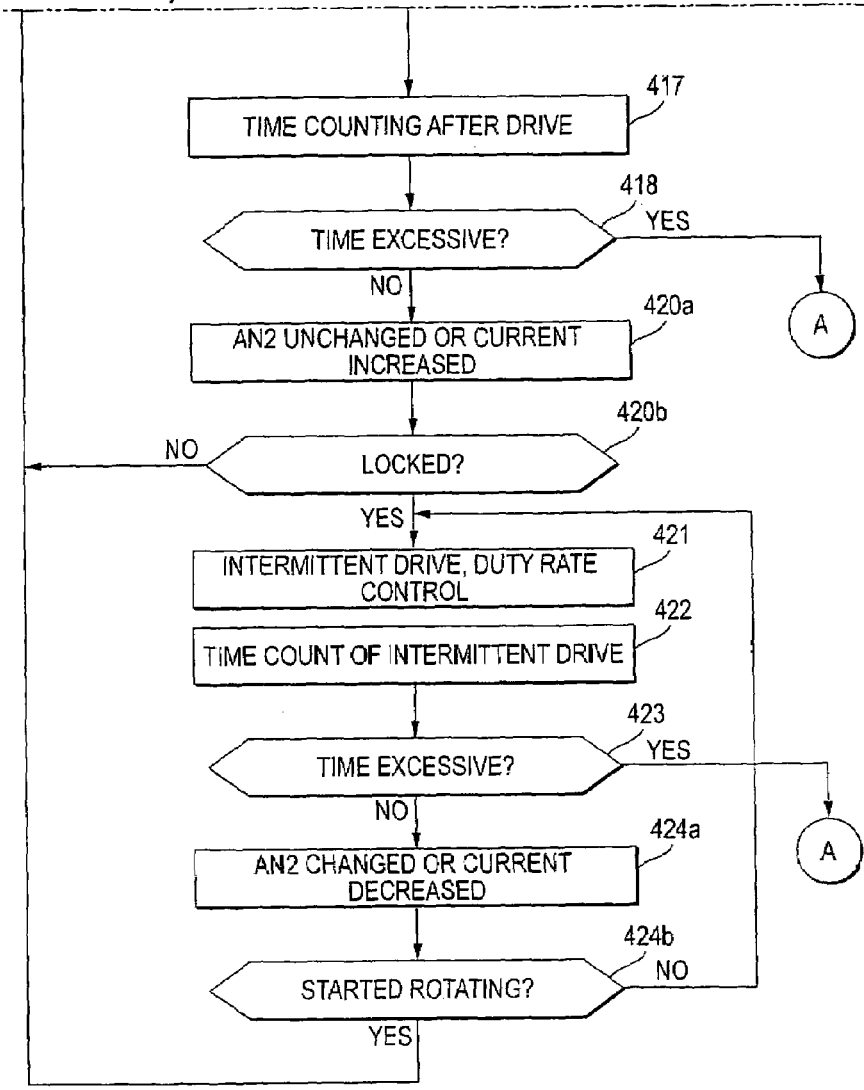

(FIG.4 CONTINUED)
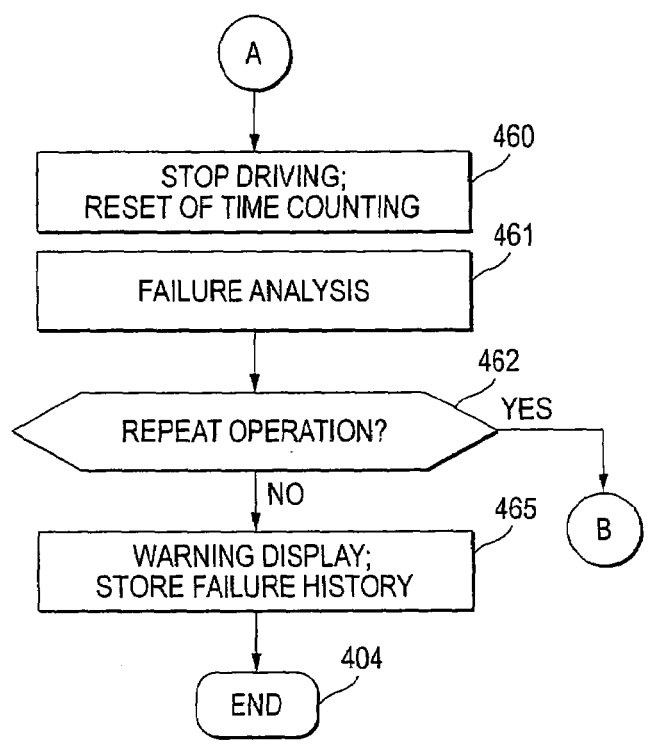

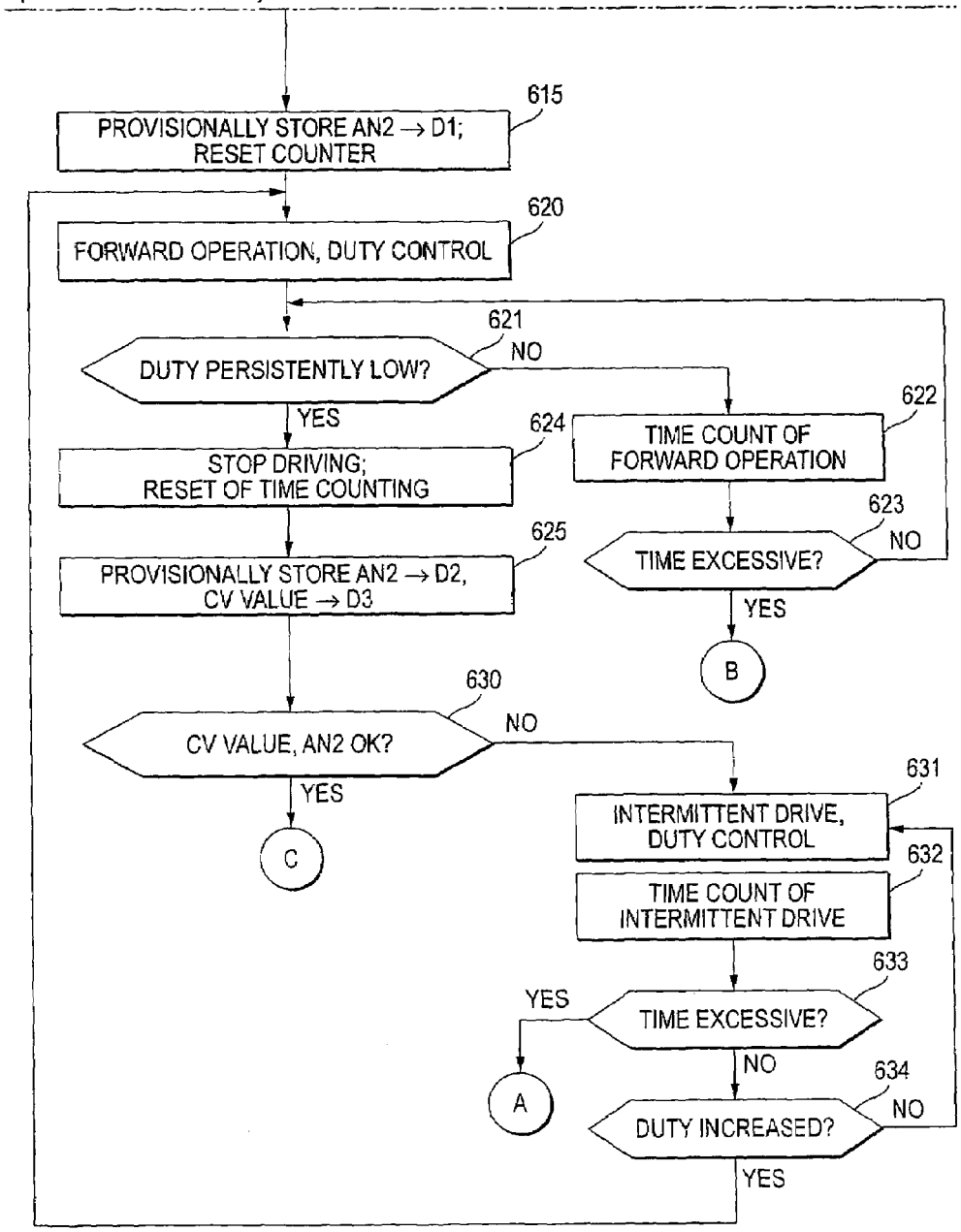

(FIG.6 CONTINUED)
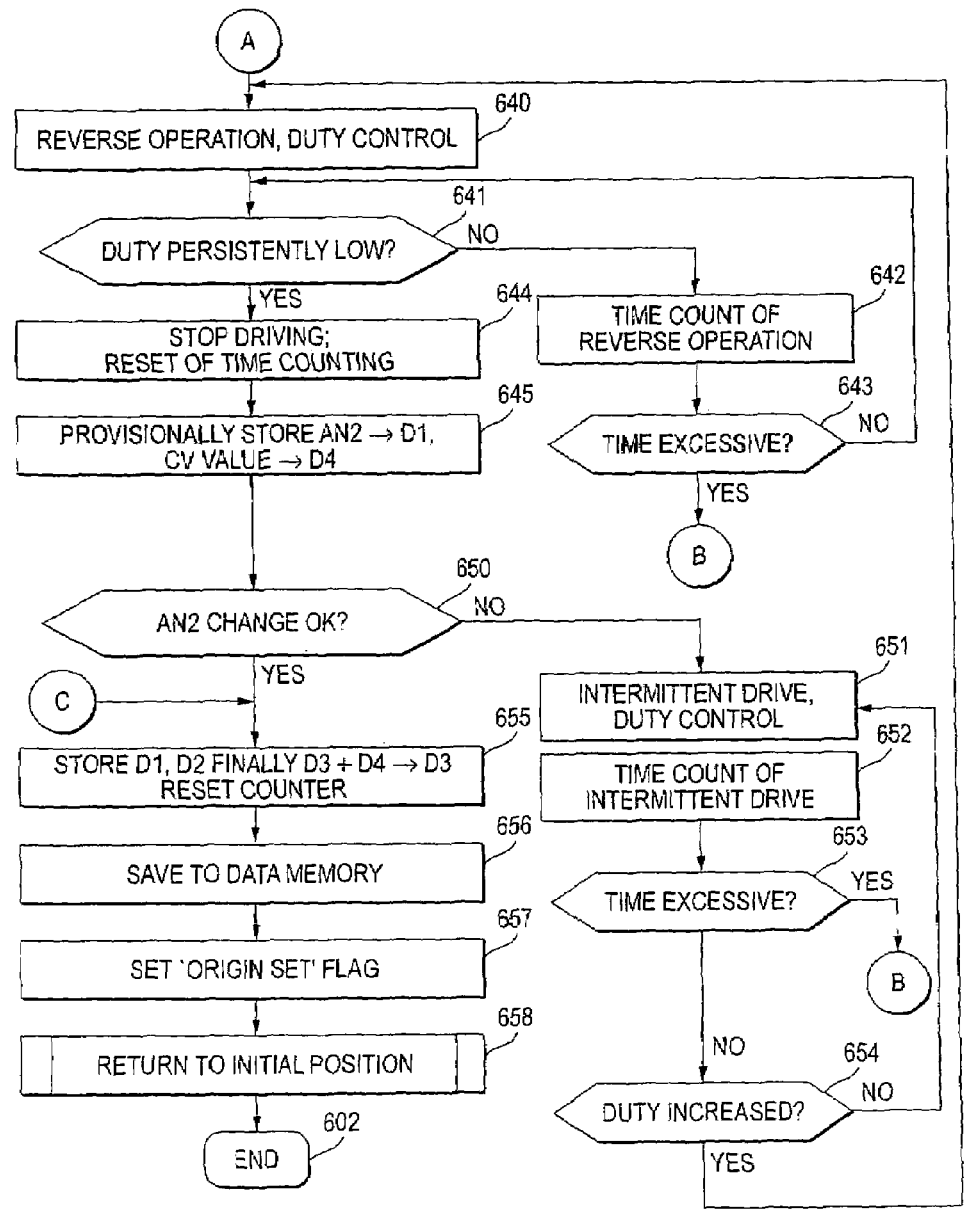
(CONT.)

(FIG.6 CONTINUED)
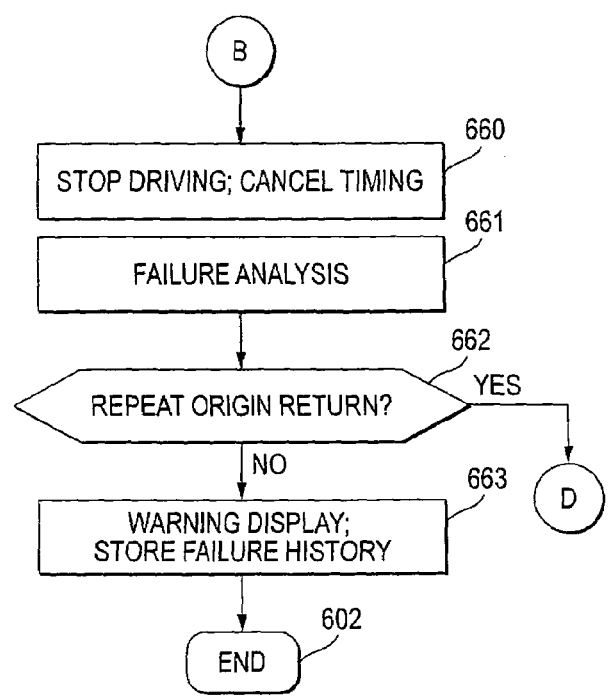

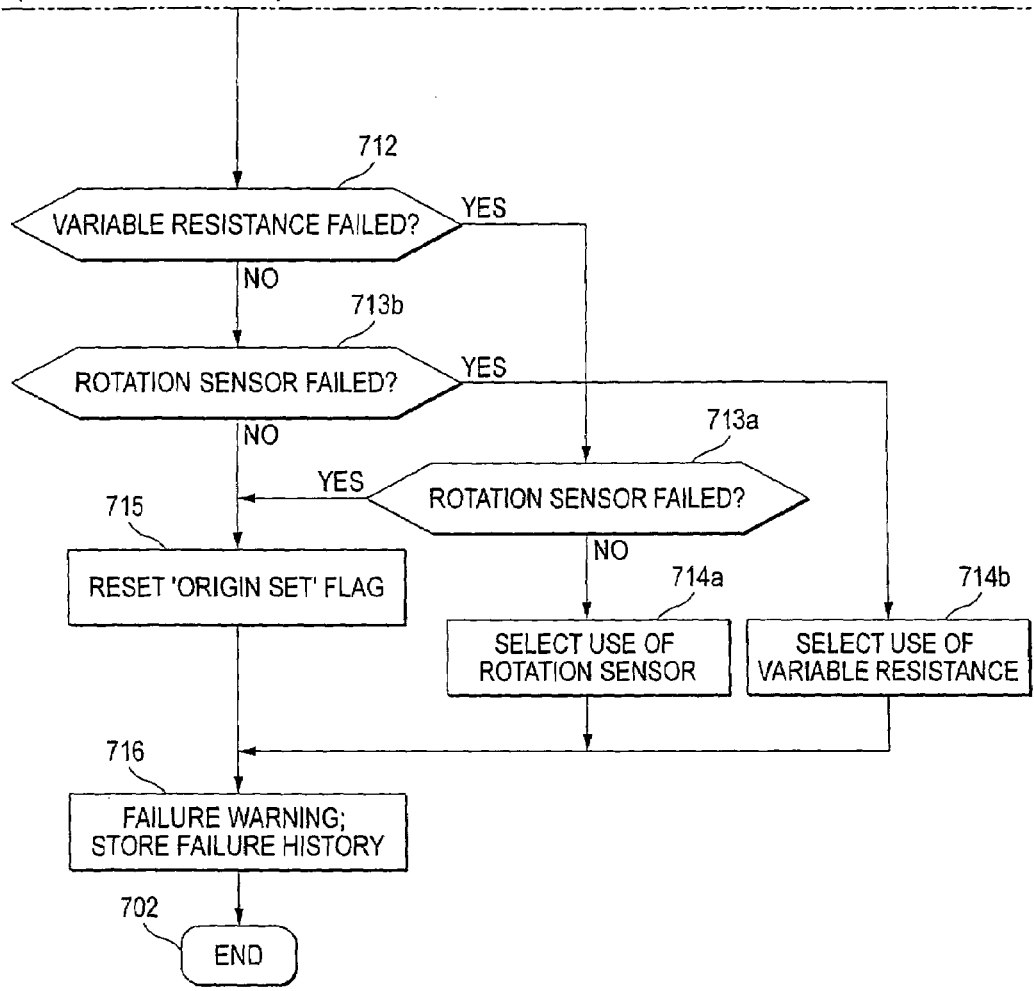

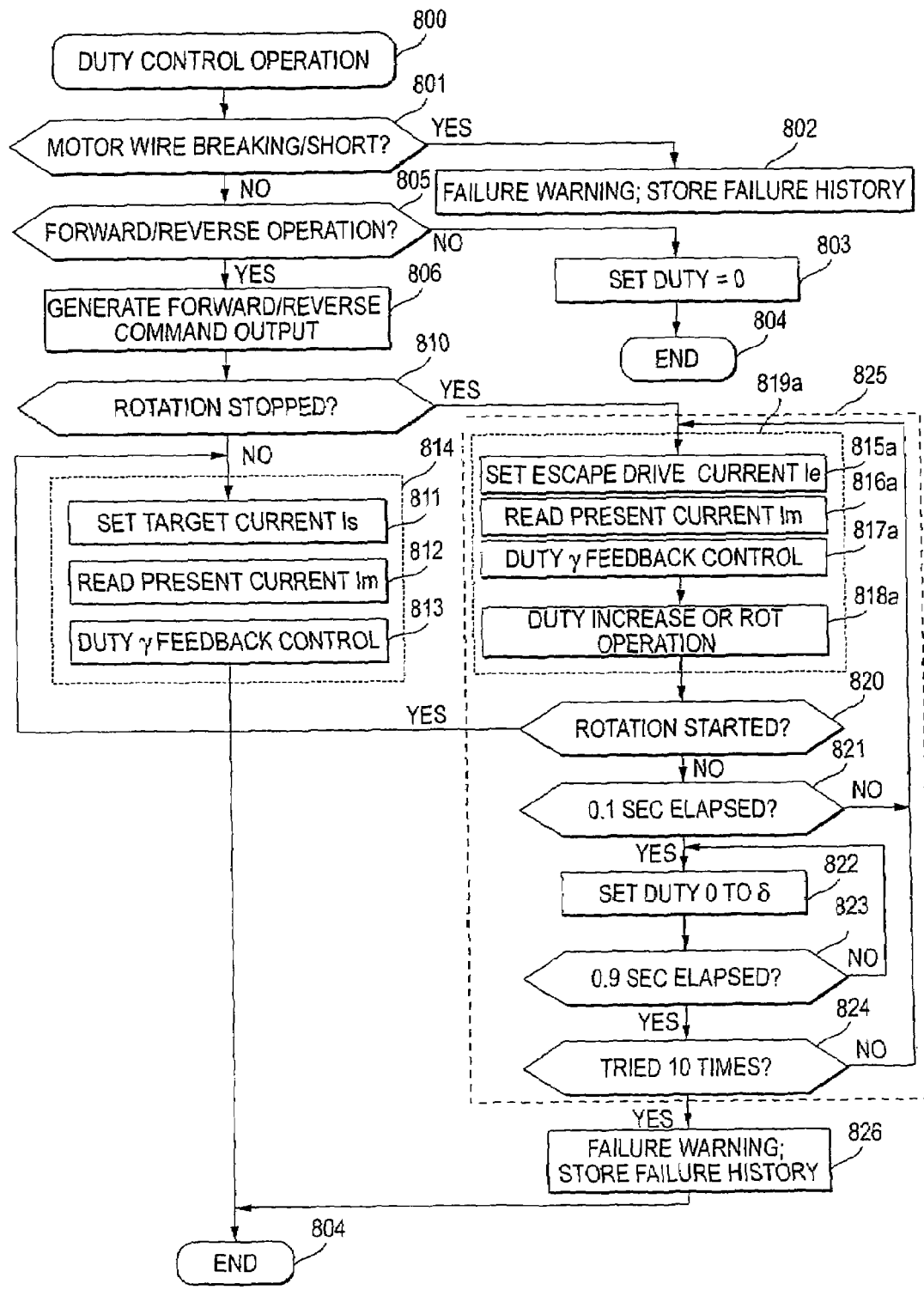

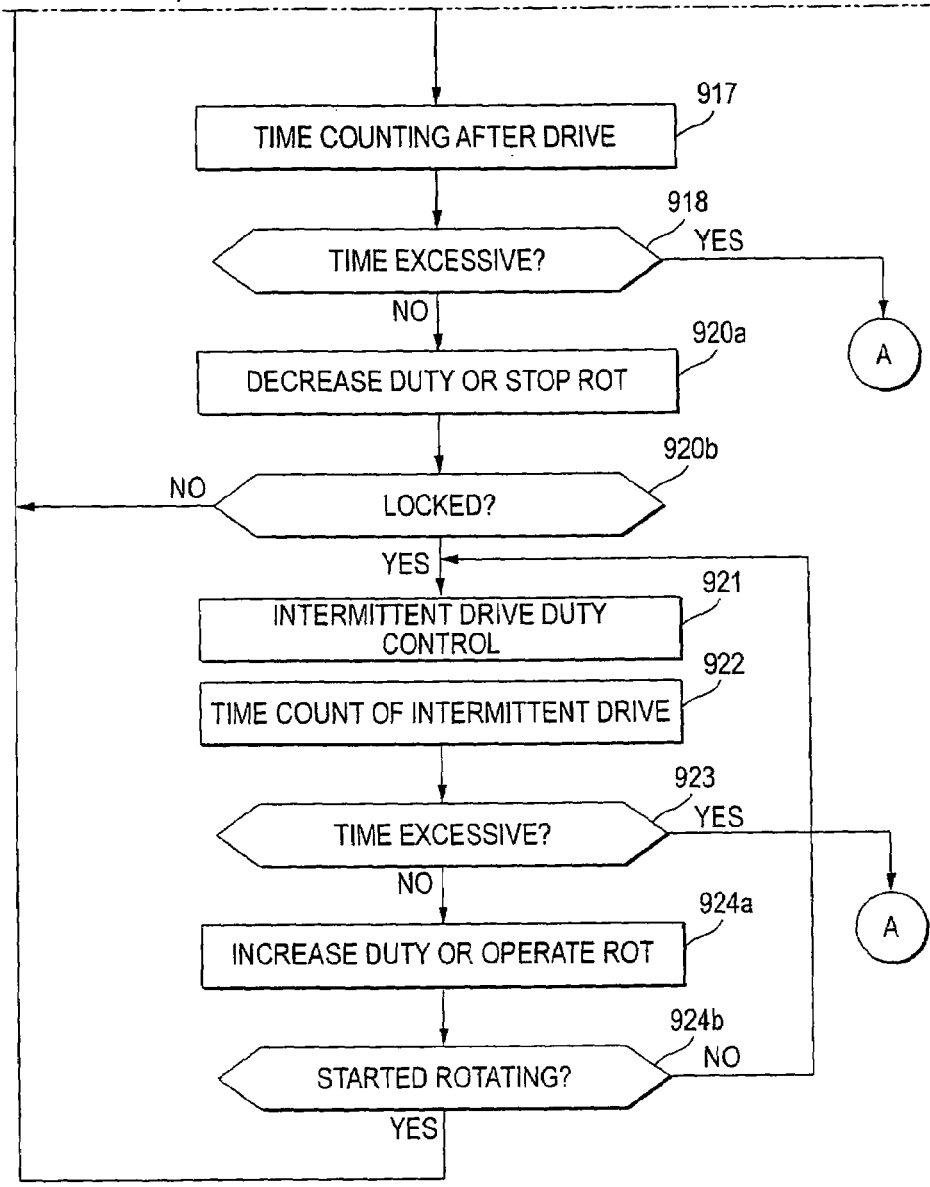

(FIG.9 CONTINUED)
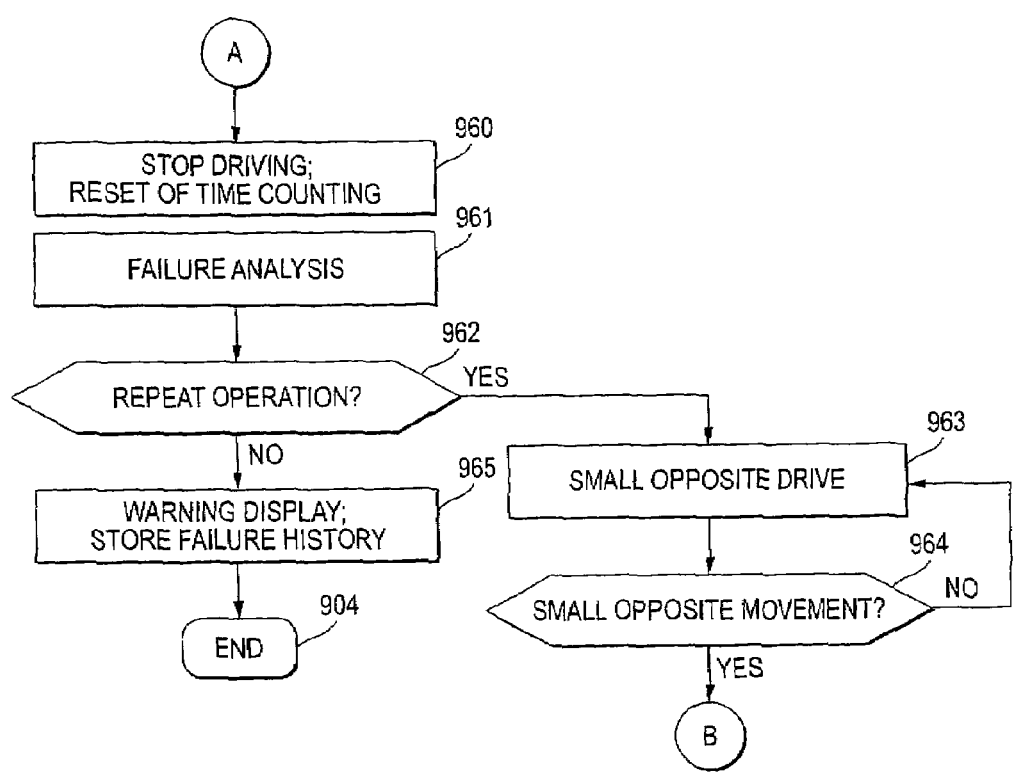

VEHICLE-MOUNTED DRIVE CONTROL APPARATUS

BACKGROUND OF THE INVENTION

This invention relates to a vehicle-mounted drive control apparatus for drive-controlling a motor that is supplied with reversible power from a vehicle battery by way of switching devices of a driving circuit and reversibly drives a moving body between a forward limit position and a reverse limit position, and particularly to a vehicle-mounted drive control apparatus with improved handling of overloading of the motor.

Motor drive control units that control the duty ratio of transistors of a bridge circuit constituting a reversible rotation driving circuit controlled by pulse width modulation by a microprocessor are in use in a wide range of applications.

For example in Patent Document 1, 'Actuator Control Apparatus', technology is disclosed in which, in a gear shift motor for switching between a four wheel drive mode and a two wheel drive mode, when rotation of the motor has come to a stop due to an overload, rotational energy of the motor is accumulated in a torsion spring, and when the overload is removed this is released to drive the load quickly, and in the load-stop state the duty ratio is lowered so that an excessive lock current does not flow through the motor, and rotation of the motor is detected by a rotation sensor.

In Patent Document 2, 'Safety Apparatus of Power Window', technology is disclosed in which a potentio-sensor (variable resistance) for detecting the rotational position of a motor for driving the opening and closing of a window is provided, the detection output of the potentio-sensor at a fully open position is stored as a calibration value, and a safety control region in the vicinity of before fully closed is detected.

In Patent Document 3, 'Engine Control Apparatus for Car', the concept is disclosed of turning off a power supply relay with a delay after a power supply switch is turned off and in that delay time returning to an origin a stepping motor for controlling idling rotation of an engine.

In other art related to the present invention, Patent Document 4, 'Breakdown Diagnosing Apparatus', discloses technology for diagnosing a wire-break or short-circuit of a potentiometer and failure of a motor part in an apparatus wherein a motor actuator detects a potentiometer signal and uses it to control a stop position.

And in Patent Document 5, 'Engine Control Apparatus', relating to the present invention, detailed technology is disclosed relating to, in electronic throttle control for electrically controlling a throttle valve aperture, besides an initial position return mechanism of a throttle valve driving mechanism, failure determining means and good source determining means relating to an accelerator position sensor and a throttle position sensor installed as a double system.

Patent Document 1: JP-A-11-089268 (FIG. 1, Abstract)
Patent Document 2: JP-A-2000-274140 (FIG. 6, Abstract)
Patent Document 3: JP-A-05-018315 (FIG. 1, Abstract)
Patent Document 4: JP-A-2000-236685 (FIG. 1, Abstract)
Patent Document 5: JP-A-2003-161194 (FIG. 2, Paragraph 0037; FIG. 5, Paragraph 0047)

In the case of the 'Actuator Control Apparatus' of Patent Document 1, it is effective in an apparatus of a construction such that the efficiency of the motor drive system is poor and reverse-driving the motor from the load side is difficult, but if the efficiency of the drive system is high a holding current for preventing reverse-rotation becomes large, and there is a risk of driving transistors and the motor burning out.

And, when a forward limit position and a reverse limit position have not been detected correctly, there is a danger of unnecessary driving being carried out at the limit positions and of an abnormal state arising such that driving is impossible.

Whereas the apparatus of Patent Document 1 has a construction wherein the rotational position of the motor can be detected with a rotation sensor, in the 'Safety Apparatus of Power Window' of Patent Document 2 the rotational position is detected by an initially calibrated potentio-sensor, the motor has an ample torque such that it can drive the window immediately before fully closed and fully open, and in a safety management region where there is a danger of the window trapping something, if the motor slows down, disengaged drive is temporarily carried out and the motor is stopped.

Thus it is enough if the motor stops when an overload state arises at an intermediate position, and there is no mention of a method of escaping from an overload state.

In the case of the 'Engine Control Apparatus for Car' of Patent Document 3, means for initializing an actuator after a power supply switch is cut and the engine stops is disclosed, but there is no mention of a method of escaping from an overload state.

Similarly, Patent Document 4 and Patent Document 5 disclose methods for identifying trouble with a potentio-sensor (variable resistance) detecting the rotational position of a motor, and do not touch upon a method of escaping from an overload state.

SUMMARY OF THE INVENTION

It is a first object of the present invention to provide a vehicle-mounted drive control apparatus capable of escaping from an overload state while avoiding burnout of a motor for reversibly driving a moving body between a forward limit position and a reverse limit position and transistors for driving the motor.

It is a second object of the invention to provide highly precise sensor calibrating means such that escape drive control will not be carried out wrongly at a forward limit position or a reverse limit position.

A vehicle-mounted drive control apparatus according to the invention is a vehicle-mounted drive control apparatus for drive-controlling a motor that is supplied with reversible electrical power from a vehicle battery by way of switching devices of a driving circuit and reversibly drives a moving body between a forward limit position and a reverse limit position, and has a microprocessor that cooperates with a nonvolatile program memory and a nonvolatile data memory and a RAM memory for processing, and has moving body position detecting means, normal drive control means, motor locked state detecting means, escape drive control means, and escape detecting means.

The moving body position detecting means are means for performing calibration at an origin position in relation to the output voltage of a variable resistance linked to the rotation of the motor or the present value of a reversible counter reversibly counting a rotation sensor and detecting the relative position of the moving body with respect to the forward limit position and the reverse limit position by monitoring at least one or the other of the output voltage of the variable resistance and the present value of the reversible counter.

The normal drive control means are either voltage control means for controlling a duty ratio of the switching devices so that the voltage impressed on the motor is substantially constant even when the power supply voltage of the vehicle battery fluctuates, or current control means for controlling the duty ratio of the switching devices so that the current supplied to the motor detected by a current detecting circuit is substantially constant even when the power supply voltage of the vehicle battery fluctuates.

The locked state detecting means are means for detecting that the motor is in a non-rotating state even though power is being supplied to it.

The escape drive control means are intermittent drive means for, acting when the moving body position detecting means is detecting a position other than the forward limit position and the reverse limit position and the motor locked state detecting means is detecting a locked state of the motor, setting a boosted drive period in which the duty ratio of the switching devices is controlled to pass a predetermined escape drive current greater than the rated current of the motor and a rest period in which the duty ratio of the switching devices is controlled to pass a holding current less than the rated current of the motor or to make the current value 0, and repeating the boosted drive period and the rest period up to a predetermined number of times.

The escape detecting means are means for detecting that the motor being driven by the escape drive control means has started rotating, and shifting to the normal drive control means.

With a vehicle-mounted drive control apparatus according to the invention, because at a time of increased load resistance an escape from the overload state can be effected by drive boosting of the motor being carried out with temperature increase of the motor and the switching devices driving it being kept down, there is the effect that the motor can be made small and the drive mechanism can be made simple.

Also, there is the effect that even if there is an increase of the load resistance in the course of origin position calibration of the moving body position detecting means being performed, an escape can be made from this and origin calibration can be carried out without fail.

And there is the effect that when a locked/stopped state of the motor arises at the forward limit position or the reverse limit position, temperature increase of the motor and the switching devices driving it can be kept down by the power supply being stopped swiftly without unnecessary boosted drive being carried out.

BRIEF DESCRIPTION OF THE DRAWINGS

FIGS. 8A and 8B are flow charts illustrating a duty control operation of the second embodiment.

FIRST EMBODIMENT

A first embodiment of the invention will now be described with reference to the overall block diagram of FIG. 1.

Figure 1:
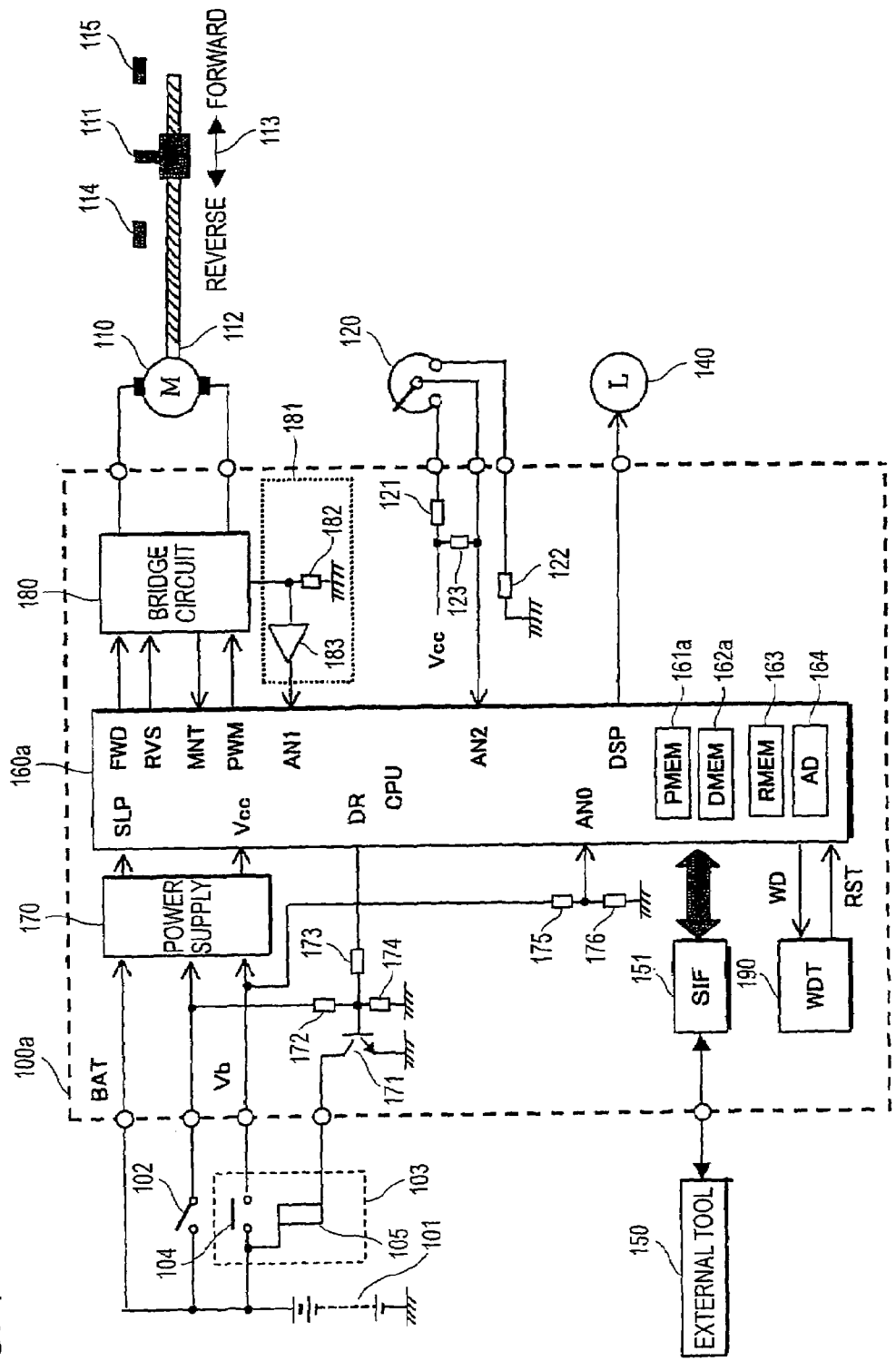
FIG. 1 is an overall block diagram showing a first embodiment of the invention.

In FIG. 1, a vehicle-mounted drive control apparatus 100a operates with a microprocessor 160a, which will be further discussed later, as its main part, and is connected via removable connectors (not shown) to external input-output devices that will be discussed below.

A vehicle battery 101 produces a d.c. voltage of for example DC12V and is connected to the vehicle-mounted drive control apparatus 100a by a power supply switch 102 such as a key switch.

A power supply relay 103 is made up of an output contact 104 and an exciting coil 105, and the output contact 104 is connected between the vehicle battery 101 and a power supply voltage terminal Vb of the vehicle-mounted drive control apparatus 100a.

The exciting coil 105 is constructed to immediately be urged and close the output contact 104 when the power supply switch 102 closes and to maintain its closing state until a self-holding output from the vehicle-mounted drive control apparatus 100a stops when the power supply switch 102 opens.

The vehicle battery 101 is also connected to a direct power supply terminal BAT of the vehicle-mounted drive control apparatus 100a, and even when the power supply switch 102 and the output contact 104 are open it supplies a small amount of power for memory-holding to a RAM memory 163 which will be further discussed later.

A motor 110 is constructed to drive by way of a rotary shaft 112 a moving body 111 for moving for example a gear shift lever of an automobile, and to forward-operate it by forward-rotating and reverse-operate it by reverse-rotating in the direction of the arrow 113.

The moving body 111 is movable between a reverse limit stopper 114 and a forward limit stopper 115, and the spacing between the reverse limit stopper 114 and the forward limit stopper 115 is pre-stored as overall distance information in a program memory 161a or a data memory 162a which will be further discussed later.

A variable resistance 120 linked to the rotation of the motor 110, for detecting the position of the moving body 111, is supplied with power from a control power supply voltage Vcc inside the vehicle-mounted drive control apparatus 100a, and a positive-side resistance 121 is series-connected in the positive-voltage side of its supply circuit and a negative-side resistance 122 is connected in the negative-voltage side.

And, a sliding terminal of the variable resistance 120 is connected to the control power supply voltage Vcc via a pull-up resistance 123 and connected to an analog input terminal AN2 of the microprocessor 160a.

Because the positive-side resistance 121, the negative-side resistance 122 and the pull-up resistance 123 are provided, the voltage of the sliding terminal of the variable resistance 120 is normally in a range of for example 0.5 to 4.5V, and when it has moved outside this range it can be deduced that there is a problem such as defective contact of the sliding terminal or a wire-break or short-circuit of wiring.

A warning display 140 is disposed in a position where it can be seen easily by a driver and performs failure notification when the microprocessor 160a issues a warning/display output DSP.

An external tool 150 is a setting and display instrument to be connected to the vehicle-mounted drive control apparatus 100a when a shipping inspection in a production line of the vehicle-mounted drive control apparatus 100a, a shipping inspection in a production line of the automobile, or a maintenance inspection at a service garage is carried out.

Next, as the internal construction of the vehicle-mounted drive control apparatus 100a, in cooperation with the program memory 161a, which is for example a nonvolatile flash memory, the data memory 162a, which is a nonvolatile EEPROM memory, the RAM memory 163, which is for operational processing, and a multi-channel AD-convertor 164, the microprocessor 160a performs pulse width modulation control of the motor 110.

A serial interface 151 is a serial-parallel convertor serially connected to the external tool 150 and bus-connected to the microprocessor 160a.

A constant-voltage power supply unit 170 is supplied with power from the vehicle battery 101 and generates a constant-voltage control power supply output Vcc of for example DC5V and supplies it to the microprocessor 160a, the nonvolatile program memory 161a, the nonvolatile data memory 162a, the RAM memory 163, the multi-channel AD-convertor 164 and the serial interface 151, and generates a sleep power supply voltage output SLP and supplies it to the RAM memory 163.

A holding transistor 171 series-connected to the exciting coil 105 is turned on via a driving resistance 172 when the power supply switch 102 closes and is kept on by a driving output DR of the microprocessor 160a via a driving resistance 173.

A ballast resistance 174 is connected across the base and emitter terminals of the transistor 171 and constitutes a dark current suppression resistance for shutting off the transistor 171 with certainty.

Potential-dividing resistances 175, 176 are series-connected to each other and supplied with power from the vehicle battery 101, and the voltage across the ends of the potential-dividing resistance 176 is connected to an analog input terminal AN0 of the microprocessor 160a.

A transistor bridge circuit 180 constituting a driving circuit is made up of a pair of negative potential side transistors series-connected to a pair of positive potential side transistors (not shown), and the motor 110 is connected across the series connection points of the transistors.

A current-detecting circuit 181 is made up of a current-detecting resistance 182 series-connected to the negative-potential side of the transistor bridge circuit 180 and an amplifier 183 for amplifying the voltage across the current-detecting resistance 182, and the output of the amplifier 183 is connected to an analog input terminal AN1 of the microprocessor 160a.

One of the positive potential side transistors of the transistor bridge circuit 180 turns on when a forward command output FWD from the microprocessor 160a is applied to it, and the other positive potential side transistor turns on when a reverse command output RVS is applied to it.

A pulse width modulation control output PWM from the microprocessor 160a is supplied to the negative potential side transistor opposite the positive potential side transistor selectively turned on by the forward command output FWD or the reverse command output RVS, a fixed modulation control period τ is for example τ=0.1 msec, and of this an on-time width ton is on-controlled at a duty ratio of 0 to 100%.

The transistor bridge circuit 180 has a built-in circuit for detecting wire-break/short-circuit failures of its transistors and wire-break/short-circuit failures of the motor 110 and its connection wires, and a failure occurrence signal is inputted to a wire-break/short-circuit monitoring input terminal MNT of the microprocessor 160a.

A watchdog timer 190 monitors the pulse width of a watchdog clear signal WD, which is a pulse train produced by the microprocessor 160a, and when this exceeds a predetermined value it generates a reset signal pulse output RST and initializes and restarts the microprocessor 160a.

In a drive control apparatus constructed as described above, predetermined control programs and control constants from the external tool 150 are stored in advance in the program memory 161a and the data memory 162a, and on the basis of these control programs and control constants the microprocessor 160a determines a target position of the moving body 111 and controls the duty ratio of the transistors in the transistor bridge circuit 180 so that the actual position of the moving body 111 approaches this target position.

Figure 2:
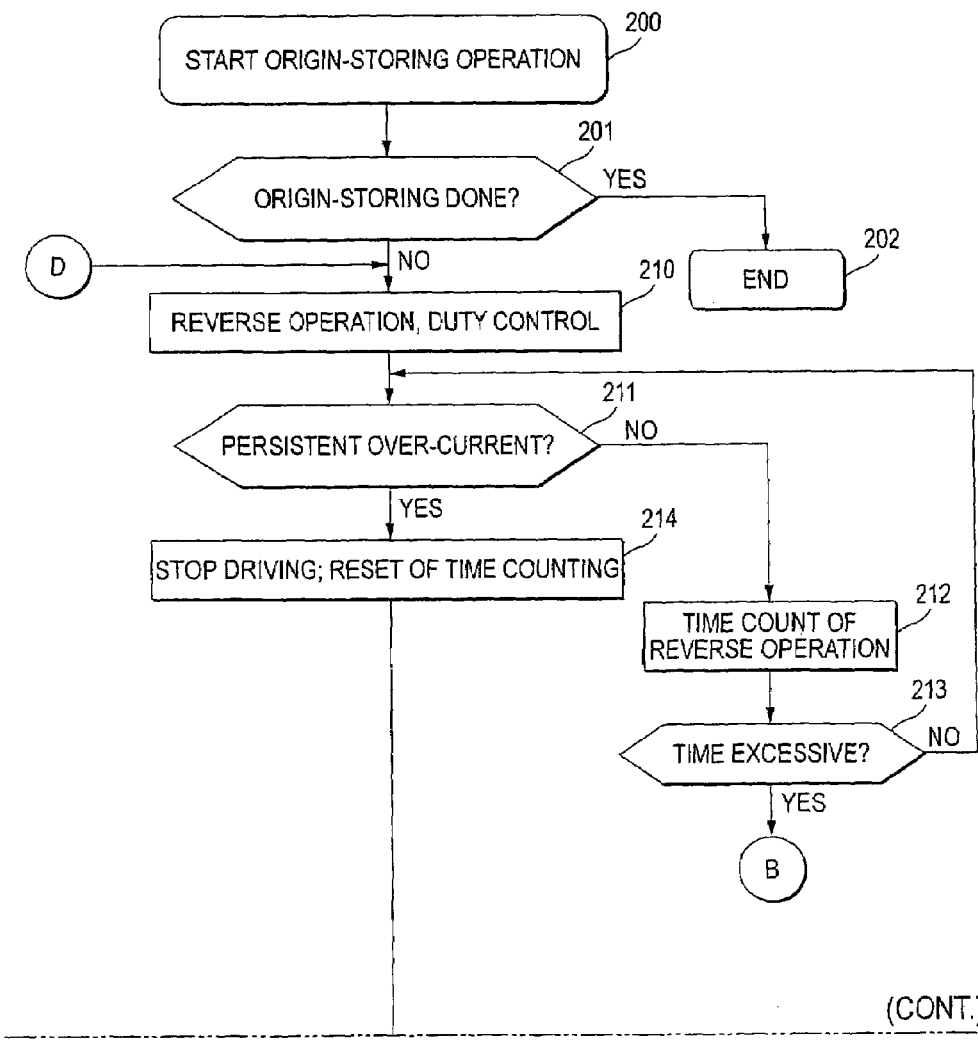
FIG. 2 is a flow chart illustrating an origin return operation of the first embodiment.

However, to check the relative positional relationship between the variable resistance 120 and the moving body 111, which are linked to the motor 110, before the product is shipped, origin-storing processing is carried out along the lines shown in FIG. 2, and position data of the moving body 111 inputted through the analog input terminal AN2 is calibrated.

Figure 3A:
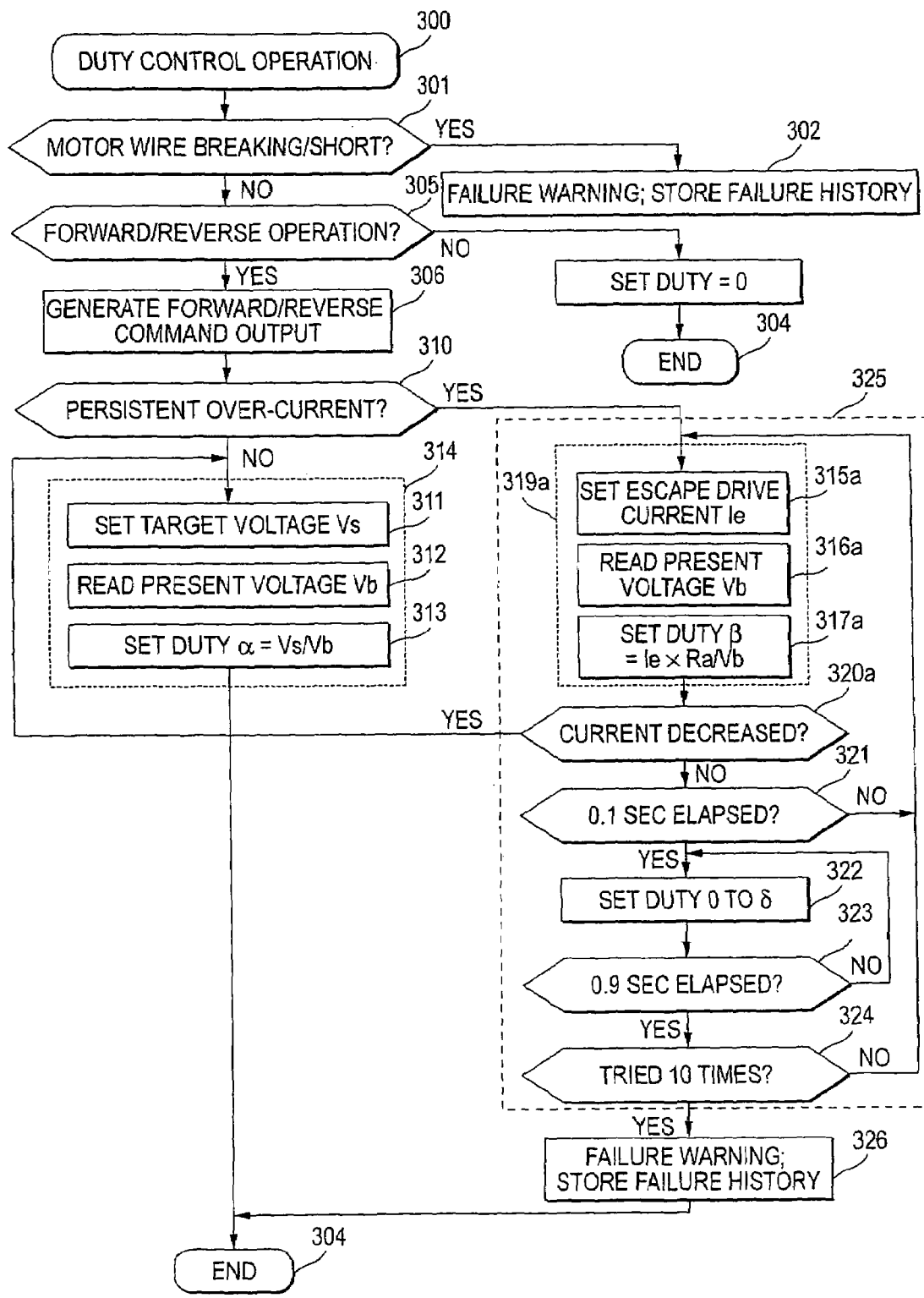
FIGS. 3A and 3B are flow charts illustrating a duty control operation of the first embodiment.
Figure 3B:
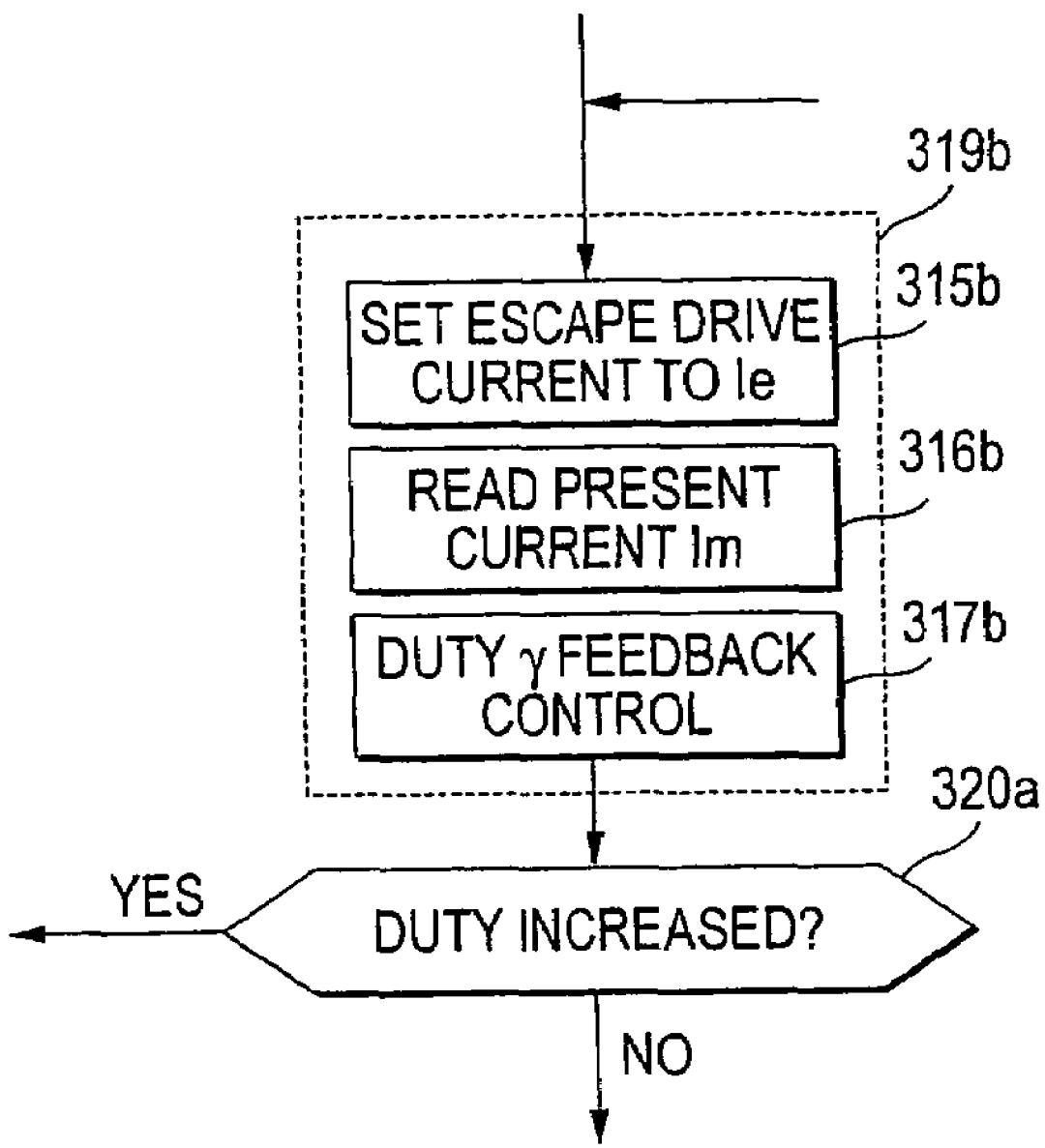
Figure 4:
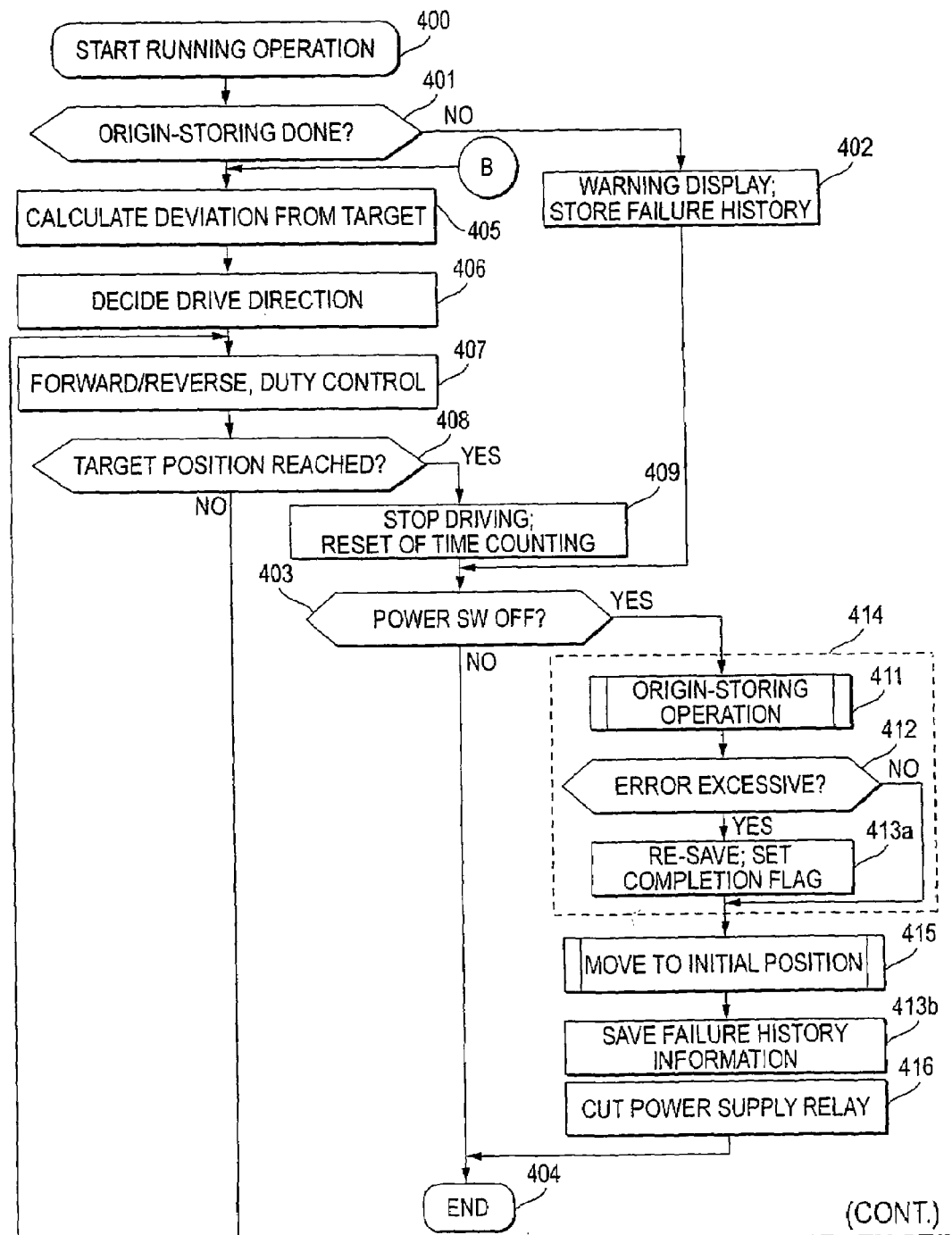
FIG. 4 is a flow chart illustrating a normal running operation of the first embodiment.

Normal operation control after the origin-storing processing is carried out is as shown in FIG. 4, and control of the duty ratio of the transistors in FIG. 2 and FIG. 4 is as shown in FIGS. 3A and 3B.

The value of the power supply voltage Vb of the vehicle battery 101 and the value of the motor current Im of the motor 110 inputted through the analog input terminals AN0, AN1 are used for controlling the duty ratio of the transistors.

When the microprocessor 160a has run away due to a noise malfunction or the like, the watchdog timer 190 operates and initializes and restarts the microprocessor 160a.

When a wire-break/short-circuit failure in the transistor bridge circuit 180 or the motor 110 and their connection circuit occurs and is inputted to the wire-break/short-circuit monitoring input terminal MNT, the warning display 140 is operated by a warning/display output DSP.

Similarly, when the voltage level of the analog input terminal AN2 is outside the range of 0.5 to 4.5V, it is inferred that there is a defective contact/wire-break/short-circuit failure of the variable resistance 120 or its connection wiring and a warning/display output DSP operates the warning display 140.

FIG. 2, which is a flow chart for illustrating an origin return operation of the apparatus shown in FIG. 1, will now be explained.

In FIG. 2, a step 200 is a step of the microprocessor 160a starting an origin-storing operation, and the following step 201 is a step of reading whether or not an origin-setting completion flag has been set in a step 257 which will be discussed later and thereby determining whether or not origin-storing has been done. When the determination of this step 201 is YES and thus storing is finished, processing proceeds to a routine-ending step 202, and when the determination of step 201 is NO and thus origin-storing has not been carried out, processing proceeds to step 210.

In step 210 the reverse command output RVS is generated and the pulse width modulation control output PWM is supplied to the transistor on the opposite side.

The duty ratio α (=ton/τ) in step 210 is set to α=Vs/Vb, the ratio of a target drive voltage Vs that will produce a rotational speed suited to the motor 110 reverse-returning and the power supply voltage Vb of the vehicle battery 101 inputted through the analog input terminal AN0.

Step 211 executed after step 210 is a step of determining whether or not the motor current inputted through the analog input terminal AN1 has exceeded a rated current and become excessive to above a predetermined value, and in this determining step any short-duration over-current of when the motor starts is ignored and not regarded as excessive.

When the determination of step 211 is NO and thus the motor current is not excessive or it is immediately after starting, step 212 is executed and timing of a reverse operation time is started by a timer (not shown), and in the following step 213 it is determined whether or not the reverse operation time is excessive, and if it is not excessive processing returns to step 211 and if the time is excessive processing proceeds to step 260, which will be discussed later.

When the determination of step 211 is YES and for example the moving body 111 has hit the reverse limit stopper 114 and stopped and the motor current has increased, step 214 is executed and the reverse command output RVS and the control output PWM are stopped and the reverse timer started in step 212 is stopped and the timer is reset.

In the following step 215 the detection output of the variable resistance 120 inputted to the analog input terminal AN2 is provisionally held at a first address D1 of the RAM memory 163, and this provisionally stored value is tentatively taken as the reverse limit position enforced by the reverse limit stopper 114; however, the possibility must be considered that actually the motor 110 stopped and step 211 detected an over-current because an abnormal load arose before the reverse limit stopper 114 was reached.

In step 220 executed after step 215 the forward command output FWD is generated and the pulse width modulation control output PWM is supplied to the transistor on the opposite side.

The duty ratio $\alpha$ (=$\tau$on/$\tau$) in step 220 is set to $\alpha$=Vs/Vb, the ratio of a target drive voltage Vs that will produce a rotational speed suited to the motor 110 forward-operating and the power supply voltage Vb of the vehicle battery 101 inputted through the analog input terminal AN0.

Step 221 executed following step 220 is a step of determining whether or not the motor current inputted through the analog input terminal AN1 has exceeded a rated current and become excessive to above a predetermined value, and in this determining step any short-duration over-current of when the motor starts is ignored and not regarded as excessive.

When the determination of step 221 is NO and thus the motor current is not excessive or it is immediately after starting, step 222 is executed and timing of a forward operation time is started by a timer (not shown), and in the following step 223 it is determined whether or not the forward operation time is excessive, and if it is not excessive processing returns to step 221 and if the time is excessive processing proceeds to step 260, which will be discussed later.

When the determination of step 221 is YES and for example the moving body 111 has hit the forward limit stopper 115 and stopped and the motor current has increased, step 224 is executed and the forward command output FWD and the control output PWM are stopped and the forward timer started in step 222 is stopped and the timer is reset.

In the following step 225 the detection output of the variable resistance 120 inputted to the analog input terminal AN2 is provisionally held at a second address D2 of the RAM memory 163, and this provisionally stored value is tentatively taken as the forward limit position enforced by the forward limit stopper 115; however, the possibility must be considered that actually the motor 110 stopped and step 221 detected an over-current because an abnormal load arose before the forward limit stopper 115 was reached.

In a step 230 executed following step 225, the difference between the value of the data D1 provisionally stored in step 215 and the value of the data D2 provisionally stored in step 225 is calculated, and a comparative determination is made of whether or not this difference value is approximately the same as the data relating to an overall movement distance pre-stored in the program memory 161*a* or the data memory 162*a*.

Step 231 is an escape drive step executed when the determination of step 230 is NO and thus the output change of the variable resistance 120 was not as it should be.

In step 231 the forward command output FWD is generated and the pulse width modulation control output PWM is supplied to the transistor on the opposite side, and the duty ratio is alternately made 0 or a very small value $\delta$ and made a $\beta$ explained below and intermittent driving is thereby carried out.

The duty ratio $\beta$ is set by writing the armature resistance of the motor 110 as Ra and calculating a drive voltage Ve=Ra×Ie such that the motor current becomes a predetermined escape drive current Ie above a rated current and below a locked rotor current, and making the duty ratio $\beta$ (=$\tau$on/$\tau$)=Ve/Vb.

In the following step 232, while intermittent driving of the motor 110 is carried out the intermitting driving time is timed, and in the following step 233 it is determined whether or not the intermittent driving time has risen above a predetermined limit time, and if it has not exceeded the time then processing proceeds to step 234 and if it has exceeded the time then the intermittent drive timer is reset and processing proceeds to step 240.

In step 234 it is determined whether or not the drive current has decreased as a result of the motor 110 starting to rotate, and if no current decrease is seen processing returns to step 231 and continues intermittent driving, and when a current decrease has occurred the intermittent drive timer started in step 232 is reset and processing returns to step 220.

By step 220, forward drive is carried out again, and when eventually the motor 110 stops at the position of the forward limit stopper 115 processing proceeds through steps 221, 224 and 225 to step 230, and when the determination of step 230 becomes YES and thus it is inferred that the change of the variable resistance 120 is as it should be processing proceeds to step 255.

In step 240 executed when the determination of step 233 was YES, the reverse command output RVS is generated and the pulse width modulation control output PWM is supplied to the transistor on the opposite side.

The duty ratio $\alpha$ (=$\tau$on/$\tau$) in step 240 is set to $\alpha$=Vs/Vb, the ratio of a target drive voltage Vs that will produce a rotational speed suited to the motor 110 reverse-returning and the power supply voltage Vb of the vehicle battery 101 inputted through the analog input terminal AN0.

Step 241 executed after step 240 is a step of determining whether or not the motor current inputted through the analog input terminal AN1 has exceeded a rated current and become excessive to above a predetermined value, and in this determining step any short-duration over-current of when the motor starts is ignored and not regarded as excessive.

When the determination of step 241 is NO and thus the motor current is not excessive or it is immediately after starting, step 242 is executed and timing of a reverse operation time is started by a timer (not shown), and in the following step 243 it is determined whether or not the reverse operation time is excessive, and if it is not excessive processing returns to step 241 and if the time is excessive processing proceeds to step 260, which will be discussed later.

When the determination of step 241 is YES and for example the moving body 111 has hit the reverse limit stopper 114 and stopped and the motor current has increased, step 244 is executed and the reverse command output RVS and the control output PWM are stopped and the reversing timer started in step 242 is stopped and the timer is reset.

In the following step 245 the detection output of the variable resistance 120 inputted to the analog input terminal AN2 is newly provisionally held at the first address D1 of the RAM memory 163, and this provisionally stored value is tentatively taken as the reverse limit position enforced by the reverse limit stopper 114; however, the possibility must be considered that actually the motor 110 stopped and step 241 detected an over-current because an abnormal load arose before the reverse limit stopper 114 was reached.

In a step 250 executed following step 245, the difference between the value of the data D1 provisionally stored in step 245 and the value of the data D2 provisionally stored in step 225 is calculated, and a comparative determination is made of whether or not this difference value is approximately the same as the data relating to an overall movement distance pre-stored in the program memory 161a or the data memory 162a.

Step 251 is an escape drive step executed when the determination of step 250 is NO and thus the output change of the variable resistance 120 was not as it should be.

In step 251 the reverse command output RVS is generated and the pulse width modulation control output PWM is supplied to the transistor on the opposite side, and the duty ratio is alternately made 0 or a very small value δ and made a β explained below and intermittent driving is thereby carried out.

The duty ratio β is set by writing the armature resistance of the motor 110 as Ra and calculating a drive voltage Ve=Ra×Ie such that the motor current becomes a predetermined escape drive current Ie above a rated current and below a locked rotor current, and making the duty ratio β (=τon/τ)=Ve/Vb.

In the following step 252, while intermittent driving of the motor 110 is carried out the intermitting driving time is timed, and in the following step 253 it is determined whether or not the intermittent driving time has risen above a predetermined limit time, and if it has not exceeded the time then processing proceeds to step 254 and if it has exceeded the time then the intermittent drive timer is reset and processing proceeds to step 260.

In step 254 it is determined whether or not the drive current has decreased as a result of the motor 110 starting to rotate, and if no current decrease is seen processing returns to step 251 and continues intermittent driving, and when a current decrease has occurred the intermittent drive timer started in step 252 is reset and processing returns to step 240.

By step 240, reverse drive is carried out again, and when eventually the motor 110 stops at the position of the reverse limit stopper 114 processing proceeds through steps 241, 244 and 245 to step 250, and when the determination of step 250 becomes YES and thus it is inferred that the change of the variable resistance 120 is as it should be processing proceeds to step 255.

In step 255 the data D1, D2 are stored finally, in the following step 256 they are transferred and saved in the nonvolatile data memory 162a, in step 257 the set state of an origin-setting completion flag is transferred and stored in the nonvolatile data memory 162a, and then processing proceeds through a step block 258 to the routine-ending step 202.

The step block 258 is a step block for moving the position of the moving body 111 to an initial position which is for example the mid-point between the forward limit stopper 115 and the reverse limit stopper 114.

In step 260 executed when a timeout determination has been made in step 213, 223, 243 or 253, the forward or reverse drive is stopped and the timer is reset, and in a failure analysis step 261 executed next it is distinguished whether the timeout determination occurred in step 213, 223 or 243, or occurred in step 253.

When the timeout occurred in step 253, the determination in the following step 262 is YES and processing proceeds to step 210 to execute the origin return operation again.

When the timeout occurred in step 213, 223 or 243, or when it is after the origin return operation has been carried out again, the determination of step 262 becomes NO and step 263 is executed, and a failure warning is displayed and a failure history is stored in the RAM memory 163.

Summarizing the main points of the operation described above, step 200 is a starting step of origin-storing processing means; steps 210, 220, 240 are normal drive control means using voltage control; steps 231, 251 are escape drive control means using limit control, in which the motor is controlled at a fixed duty ratio irrespective of its speed; steps 211, 221, 241 are locked state detecting means; steps 215, 245 are first provisional storing means; step 225 is a second provisional storing means; steps 230, 250 are comparative determining means; steps 234, 254 are escape detecting means; step 256 is saving means; and step 263 is failure notification means.

The flow from step 210 to step 215 temporarily reverse-stops the moving body 111 and provisionally stores the output voltage of the variable resistance 120 as data D1.

The flow from step 220 to step 225 forward-operates the moving body 111 and provisionally stores the output voltage of the variable resistance 120 at a forward stop position as data D2.

In step 230 it is determined whether or not the difference between the output voltages stored as the data D1 and D2 is a predetermined value, and if it is the predetermined value the origin-setting operation has been successful and saving to the data memory 162a and returning to the initial position are performed by the flow of step 255 to step 258.

The flow of step 231 to step 234 is executed when the difference between the output voltages stored as the data D1 and D2 has not reached a predetermined value and thus the movement was insufficient; it effects an escape boosted drive, and if a sufficient movement is obtained and the difference value becomes a correct value the origin-setting operation is successful and saving to the data memory 162a and returning to the initial position are performed by the flow of step 255 to step 258.

However, when part-way through the reverse operation of step 210 to step 215 a state of excessive load has arisen and the moving body 111 has not reversed as far as the position of the reverse limit stopper 114, by the series of operations of from step 220 to step 234 the predetermined amount of movement cannot be reached, and the escape drive of step 231 becomes an action trying to effect a further forward operation at the position of the forward limit stopper 115.

In this case step 233 performs a timeout determination and processing moves to step 240 and by the operation of from step 240 to step 254 an operation of returning to the reverse limit position 114 is carried out, in step 250 the amount of movement is checked again and if it is a correct value the origin-setting operation has been successful and saving to the data memory 162a and returning to the initial position are performed by the flow of step 255 to step 258.

When in the operation of returning to the reverse limit position the moving body 111 stops and even when escape drive control is carried out for a predetermined time the predetermined amount of movement is not reached, a timeout determination is made in step 253 and from step 260 to step 263 are executed and the origin-setting operation is carried out again.

In a hit-and-stop type origin-setting operation like this it is important for it to be determined that the moving body 111 has been stopped by the forward limit stopper 115 or the reverse limit stopper 114 and not stopped as a result of an excessive load, and whether or not origin-setting has been carried out certainly is determined by the checking of the change in the variable resistance 120 performed by step 230 and step 250, and when an excessive load has arisen the escape drive of the escape drive control means 231, 251 is carried out.

Next, FIGS. 3A and 3B, which are flow charts illustrating the duty control operation of the apparatus shown in FIG. 1, will be discussed.

In FIG. 3A, which is an overall flow chart of the duty control, step 300 is a start step of duty control operation of the microprocessor 160a, the following step 301 is a step of determining whether or not there has been a failure of the drive circuitry by determining the logic level of the wire-break/short-circuit monitoring signal MNT relating to the drive transistors of the transistor bridge circuit 180 and the motor 110 and its connection wiring, and when the determination of step 301 is that there has been a failure step 302 is executed and failure notification by the warning display 140 and storing of failure history information in the RAM memory 163 are carried out before processing proceeds to step 303, in step 303 the duty ratio is made 0 before processing proceeds to a routine-ending step 304, and in step 304 other control operations are carried out before processing cycles to step 300 again.

When the determination of step 301 is that there has been no failure step 305 is executed, in step 305 a determination of whether or not to carry out forward/reverse operation is made on the basis of the difference between the target position of the moving body 111 and its present position, when forward/reverse operation is not to be carried out processing proceeds to step 303 and makes the duty ratio 0, and when forward/reverse operation is to be carried out processing proceeds to step 306 and generates a forward command output FWD or reverse command output RVS.

In step 310 executed after step 306 it is determined whether or not an over-current of the motor 110 is persisting, and when the motor 110 has stopped and an over-current is flowing processing proceeds to step 315a, and at a time of initial operation when a duty ratio has not yet been decided, when a starting current is flowing immediately after the motor 110 starts rotating, or when a normal current is flowing, processing proceeds to step 311.

In step 311 a target drive voltage Vs necessary to obtain a suitable motor speed is set, in the following step 312 the present power supply voltage Vb is read out, in the following step 313 a duty ratio α is determined as α=Vs/Vb, and then processing proceeds to the routine-ending step 304.

The step block 314 made up of steps 311, 312 and 313 constitutes normal drive control means using voltage control.

In step 315a an escape drive current Ie is set, in the following step 316a the present power supply voltage Vb is read out, in the following step 317a a duty ratio β is determined as β=Ie×Ra/Vb, and then processing proceeds to step 320a, which is escape detecting means.

Ra is the armature resistance of the motor 110, and the step block 319a made up of steps 315a, 316a and 317a constitutes boosted drive means using limit control for maintaining a fixed duty ratio β irrespective of the speed of the motor.

When in step 320a it is determined that the current of the motor 110 has decreased and therefore it has started rotating, processing proceeds to step 311, and when the current has still not decreased processing proceeds to step 321.

In step 321, which is for deciding a boosted drive period, the elapsed time from when the boosted drive of the step block 319a started is determined, and for example if the elapsed time is not greater than 0.1 seconds processing returns to step 315a and continues boosted drive, and when it exceeds 0.1 seconds processing proceeds to step 322.

In step 322 the duty ratio is made 0 or setting to provide a small holding current is carried out and then processing proceeds to step 323.

In step 323, which is for deciding a rest period, the elapsed time of resting drive started in step 322 is determined, and for example if the elapsed time is not greater than 0.9 seconds processing returns to step 322 and continues the resting drive, and when it rises above 0.9 seconds processing proceeds to step 324.

In step 324 it is determined whether or not intermittent drive made up of boosted drive performed by the step block 319a and resting drive performed by step 322 has taken place not more than for example ten times, and if not more than ten times processing proceeds to step 315a and continues intermittent drive, and when it rises above ten times processing proceeds to step 326 and failure notification with the warning display 140 and write-saving of a failure history to the RAM memory 163 are carried out, and then processing proceeds to the routine-ending step 304.

The step block 325 made up of from step 315a to 324 constitutes escape drive control means.

In FIG. 3B, which shows another embodiment of the boosted drive means 319a, an escape drive current Ie is set in a step 315b, in the following step 316b the present motor current Im is read out, in the following step 317b feedback control is carried out to control the size of the duty ratio γ so that the motor current Im approaches the escape drive current Ie, and a step block 319b made up of the steps 315b, 316b and 317b constitutes boosted drive means using feedback control in which the duty ratio γ varies with the speed of the motor.

When in the following step 320b it is determined on the basis that the duty ratio γ has increased that rotation has started processing proceeds to step 311, and when the duty ratio has not yet increased processing proceeds to step 321.

Summarizing the main points of the operation described above, step 310 is locked state detecting means, step block 314 is normal drive control means using voltage control, step block 319a is boosted drive means using limit control for controlling to a fixed duty ratio irrespective of the speed of the motor, step block 319b is boosted drive means using feedback control that keeps the motor current at a predetermined value, step 320a and step 320b are escape detecting means, step 321 is a boosted drive period, step 323 is a rest period, step 325 is escape drive control means, and step 326 is failure notification means.

The normal drive control means 210, 220, 240 in FIG. 2 are in detail what is shown in the step block 314, and the escape drive control means 231, 251 in FIG. 2 are based on the step block 325.

Next, FIG. 4, which is a flow chart illustrating normal running operation of the apparatus shown in FIG. 1, will be explained.

In FIG. 4, step 400 is a step of the microprocessor 160a starting normal running operation of the motor 110, the following step 401 is a step of determining whether or not origin-storing has been done by reading whether or not the origin-setting completion flag has been set in step 257 of FIG. 2 or a step 413a discussed below, and when the determination of step 401 is YES and origin-storing has been done processing proceeds to step 405 and when the determination of step 401 is NO and origin-storing has not been done processing proceeds to step 402.

The origin-setting operation of FIG. 2 is executed on a product shipping line at the manufacturer, and because in normal running mode it is abnormal for origin-setting not to have been completed, in step 402 failure notification by the warning display 140 and write-saving of history information to the RAM memory 163 are carried out.

In step 403 executed after step 402 it is determined whether or not the power supply switch 102 has been turned off, and if it is still on then processing proceeds to a routine-ending step 404.

After the microprocessor 160a carries out other control operations in the routine-ending step 404 the operation starting step 400 is activated again, and when in the course of steps 400, 401, 402, 403 and 404 being cyclically executed step 403 detects that the power supply switch 102 is off, processing proceeds to a step block 411.

The step block 411 is the overall routine of the origin-storing processing operation shown in FIG. 2, and this step block is executed whenever the power supply switch 102 is turned off, as will be further discussed later.

In a step 412 executed after that it is determined whether or not origin calibration information already saved and the origin calibration information newly obtained agree, and if the error between them is excessive or there is no existing information then step 413a is executed and the new information is saved in the data memory 162a.

A step block 414 is made up of the step block 411 and steps 412 and 413a and constitutes origin-storing/confirming means.

A step block 415 executed when the determination of step 412 is that the error is small or following step 413a constitutes a running operation step of moving the moving body 111 in advance with an initial position of the moving body 111 as of when running is restarted as a target position.

Step 413b executed after that is a step of transferring and saving to the data memory 162a any failure history information that was write-saved in the RAM memory 163 during running, the next step 416 is a step of stopping the driving output DR of the microprocessor 160a before moving to the routine-ending step 404, and when the driving output DR is stopped the self-holding transistor 171 turns off and the power supply relay 103 is de-energized and the supply of power to the vehicle-mounted drive control apparatus 100a is stopped.

When the determination of step 401 is that origin-storing has been done step 405 is executed, and in step 405 the deviation between the movement target position and the present position of the moving body 111 converted into an output voltage of the variable resistance 120, and its sign, are calculated.

In the following step 406 a rotation direction of the motor 110 is decided in accordance with the sign of the deviation calculated in step 405, and a forward command output FWD or a reverse command output RVS is generated.

In the following step 407 a pulse width modulation control output PWM is supplied to the transistor opposite the transistor turned on by the forward command output FWD or reverse command output RVS.

The duty ratio $\alpha$ ($=\tau on/\tau$) in step 407, which constitutes normal drive control means, is set to $\alpha=Vs/Vb$, the ratio of a drive voltage Vs suited to the target speed of the motor 110 and the power supply voltage Vb of the vehicle battery 101 inputted through the analog input terminal AN0.

Control that makes the target speed of the motor 110 its rated speed when the positional deviation is large and gradually reduces the speed as the target position is neared is usual.

In step 408 executed following step 407 it is determined whether or not the moving body 111 has reached the target position, and if it has reached the target position step 409 is executed and driving of the motor 110 is stopped and a timer started in step 417, discussed below, is reset, and then processing proceeds via step 403 to the routine-ending step 404.

However, if when step 403 is executed the power supply switch 102 is off then the step blocks 414 and 415 and steps 413b and 416 are executed before processing proceeds to the routine-ending step 404.

When the determination of step 408 is NO and the target position has not been reached then step 417 is executed and a drive time timer is started, and in the following step 418 it is determined whether or not this timer has reached time up, and if the determination is that the time is excessive processing proceeds to step 460, and if the determination of step 418 is that the time is not excessive step 420a is executed.

In step 420a the change in the output voltage of the variable resistance 120 inputted to the analog input terminal AN2 between the time of the last execution and the time of this execution, or the difference in current between the motor current Im of the motor 110 inputted to the analog input terminal AN1 and the rated current, is measured.

Step 420b, which is locked state detecting means, is executed after step 420a, and determines whether or not the change in the output voltage of the variable resistance 120 calculated in step 420a is 0 and therefore the motor 110 has come to a forced stop, or the current through the motor 110 has risen above a predetermined threshold value and therefore the motor has come to a forced stop, and when the motor 110 has not stopped processing returns to step 407 and continues driving the motor 110, and when it determines that the motor 110 has come to a forced stop it resets the timer started in step 417 and then proceeds to step 421.

In step 421, which constitutes escape drive control means, the intermittent drive shown in step block 325 of FIG. 3A is carried out, and in the following step 422 the intermittent drive time is timed while intermittent driving of the motor 110 is carried out, and in the following step 423 it is determined whether or not the intermittent drive time has exceeded a predetermined limit time, and if it has not exceeded the time then processing proceeds to step 424a and if it has exceeded the time then processing proceeds to step 460.

In step 424a, in the same way as in step 420a, the change in the output voltage of the variable resistance 120 inputted to the analog input terminal AN2 between the time of the previous execution and the time of the present execution, or the difference between the motor current Im of the motor 110 inputted to the analog input terminal AN1 and the rated current, is measured.

Step 424b, which constitutes escape detecting means, is executed following step 424a, and determines whether or not there has been a change in the output voltage of the variable resistance 120 calculated in step 424a and therefore the motor 110 has started rotating, or the current of the motor 110 has fallen below a predetermined threshold value and therefore the motor has started rotating, and when the motor 110 is still not rotating processing returns to step 421 and continues escape driving of the motor 110, and when it is determined that the motor 110 has started rotating the timer started in step 422 is reset and processing proceeds to step 407.

In step 460 executed when a timeout determination was made in step 418 or 423, forward or reverse driving is stopped and the timer is reset, and in the failure analysis step 461 executed after that it is distinguished whether the timeout determination occurred in step 418 or occurred in step 423.

When the timeout occurred in step 423 the determination of the following step 462 is YES and processing proceeds to step 405 again.

When the timeout occurred in step 418, or when it is after running operation has been carried out again, the determination of step 462 is NO and step 465 is executed, a failure warning display is carried out and a failure history is stored in the RAM memory 163.

Summarizing the main points of the operation described above, step 407 is normal drive control means, step 411 is origin-storing processing means, step 414 is origin-storing/confirming means, step 420b is locked state detecting means, step 421 is escape drive control means, step 424b is escape detecting means, and step 465 is failure notification means.

The normal drive control means 407 is in detail as shown in step block 314 of FIG. 3A, and the escape drive control means 421 is in detail as shown in step block 325 of FIG. 3A.

And, in the locked state detecting means 211, 221, 241 in FIG. 2 and the locked state detecting means 310 in FIG. 3A the determination can be made on the basis of a stop of changing of the variable resistance 120 or an excessive motor current, as in step 420b, and in the escape detecting means 234, 254 in FIG. 2 and the escape detecting means 320a, 320b in FIGS. 3A and 3B the determination can be made on the basis of a start of changing of the variable resistance 120 or a decreased motor current in the same way as in step 424b.

As is clear from the foregoing explanation, the vehicle-mounted drive control apparatus 100a of this first embodiment of the invention is a vehicle-mounted drive control apparatus 100a for drive-controlling a motor 110 supplied with reversible power from a vehicle battery 101 through switching devices constituting a driving circuit 180 and reversibly driving a moving body 111 between a forward limit position 115 and a reverse limit position 114, and this vehicle-mounted drive control apparatus 100a has a microprocessor 160a cooperating with a nonvolatile program memory 161a and a nonvolatile data memory 162a and a RAM memory for processing 163 and also has moving body position detecting means and normal drive control means and motor locked state detecting means and escape drive control means and escape detecting means.

The moving body position detecting means is means for performing calibration at an origin position with respect to the output voltage of a variable resistance 120 linked to rotation of the motor 110 and detecting the position of the moving body 111 relative to the forward limit position 115 and the reverse limit position 114 by monitoring the value of the output voltage.

The normal drive control means 314 is voltage control means for controlling a duty ratio α of the switching devices so that even if the power supply voltage Vb of the vehicle battery 101 fluctuates the voltage impressed on the motor 110 is substantially constant.

The locked state detecting means 310 is means for detecting that the motor 110 is not rotating even though power is being supplied to it.

The escape drive control means 325 is intermittent driving means for, operating when the moving body position detecting means 120 is detecting a position other than the forward limit position 115 and the reverse limit position 114 and the motor 110 locked state detecting means 310 is detecting a locked state of the motor 110, controlling a duty ratio β of the switching devices to set a boosted drive period 321 in which a predetermined escape drive current Ie exceeding the rated current of the motor 110 is passed through the motor 110 and controlling the duty ratio of the switching devices to set a rest period 323 in which a holding current less than the rated current is passed through the motor 110 or the current value is 0, and repeating the boosted drive period 321 and the rest period 323 over a range up to a predetermined number of times.

The escape detecting means 320a is means for detecting that the motor 110 being driven by the escape drive control means 325 has started rotating, and shifting to the normal drive control means 314.

The program memory 161a includes a program constituting the origin-storing processing means 200, and the origin-storing processing means 200 is made up of first and second provisional storing means, comparative determining means and saving means.

The first provisional storing means 215, 245 are means for reading and storing the value of the variable resistance 120 as of when the locked state detecting means 211, 241 detect a locked state of the motor 110 as the moving body 111 is being driven in the reverse direction.

The second provisional storing means 225 are means for reading and storing the value of the variable resistance 120 as of when the locked state detecting means 221 detects a locked state of the motor 110 as the moving body 111 is being driven in the forward direction.

The comparative determining means 230, 250 are means for comparing whether or not the value of the difference between the first and second provisionally stored values and a set value relating to an overall movement distance stored in the program memory 161a or the data memory 162a are substantially the same.

The saving means 256 are means for, when the comparison result of the comparative determining means 230, 250 is that the values are substantially the same, transferring the first and second provisionally stored values to the data memory 162a as a reverse limit position and a forward limit position.

Accordingly, there is the characteristic that even when the relationship between the mounting position of the variable resistance 120 and the position of the moving body 111 is uncertain, by calibration processing pertaining to the device actually mounted it is possible to measure the position of the moving body exactly.

In particular, there is the characteristic that when due to an abnormal increase in the encountered load resistance the moving body 111 has not moved normally, this can be detected and calibration carried out with certainty by the calibration operation being carried out again.

The origin-storing processing means 200 is executed when the vehicle-mounted drive control apparatus 100a is assembled to the vehicle, the vehicle-mounted drive control apparatus 100a is supplied with power from the vehicle battery 101 by way of a power supply relay 103 that is urged by way of a power supply switch 102 and makes a delayed return when the power supply switch 102 is turned off, and the program memory 161a includes a program constituting the origin-storing/confirming means 414.

The origin-storing/confirming means 414 operates in the period from when the power supply switch 102 is opened to when the power supply relay 103 is cut, and is means for executing a program constituting the origin-storing processing means 200 and, when there is an error between the saved information newly obtained and saved information already held in the data memory 162a, updating the content of the data memory to the new saved information.

Accordingly, there is the characteristic that even when an abnormality arises in the stored calibration information, because updating of the origin information can be carried out with the power supply switch 102 turned off, safety is increased, and the number of re-writings to the nonvolatile data memory 162a can be kept down.

The locked state detecting means 420b detects a locked state when the current supplied to the motor 110 being driven by the normal drive control means 407 and having a fixed voltage applied to it becomes excessive to above a predetermined value.

Accordingly, there is the characteristic that even when the variable resistance 120 fails, it is possible to detect a locked/stopped state of the motor 110 without fail and prevent burnout of the motor 110 and the switching devices driving it.

The locked state detecting means 420b detects a locked state on the basis that the output voltage of the variable resistance 120 is not changing even though power is being supplied to the motor 110.

Accordingly, there is the characteristic that a locked/stopped state of the motor 110 can be detected simply without depending on voltage/current monitoring of the motor 110.

The escape drive control means 325 is either boosted drive means 319b for controlling a duty ratio $\gamma$ of the switching devices and performing feedback control so that the motor current Im of the motor 110 approaches a predetermined escape drive current Ie greater than the rated current of the motor 110, or boosted drive means 319a for making a duty ratio $\beta$ of the switching devices a fixed value irrespective of the speed of the motor 110 and performing limit control of the duty ratio $\beta$ of the switching devices so that a predetermined escape drive current Ie greater than the rated current is supplied to the motor 110 in a locked state.

Accordingly, there is the characteristic that by holding the escape drive current Ie at a fixed value it is possible to obtain a stable escape drive torque even when the power supply voltage Vb fluctuates.

The escape detecting means 320a/320b either detect that the duty ratio $\gamma$ of the switching devices being feedback controlled by the escape drive control means 325 so as to provide a fixed escape current has risen above a predetermined value, or detect that the motor current Im of the motor 110 has fallen below a predetermined value when a duty ratio $\beta$ of the switching devices is being controlled so that the escape current in the locked state assumes a predetermined value.

Accordingly, there is the characteristic that it is possible to detect that the motor 110 is starting to rotate without fail, without monitoring output changes of the variable resistance 120.

The escape detecting means 424b detects that the output voltage of the variable resistance 120 has changed.

Accordingly, there is the characteristic that it is possible to detect that the motor 110 is starting to rotate simply, without depending on voltage/current monitoring of the motor 110.

The escape drive control means 325 has failure notification means 326 which operates when the escape detecting means 320a/320b cannot detect an escaped state even when escape drive is carried out for longer than a predetermined time and stops the supply of power to the motor 110 and operates a warning display 140, and records as failure history information in the data memory 162a that a failure notification has been carried out.

Accordingly, there is the characteristic that burning out of the switching devices and the motor 110 can be prevented, and not only are failures reported but also history information for maintenance checks can be obtained.

SECOND EMBODIMENT

A second embodiment of the invention will now be described with reference to the overall block diagram of FIG. 5, concentrating on points of difference from the apparatus shown in FIG. 1.

Figure 5:
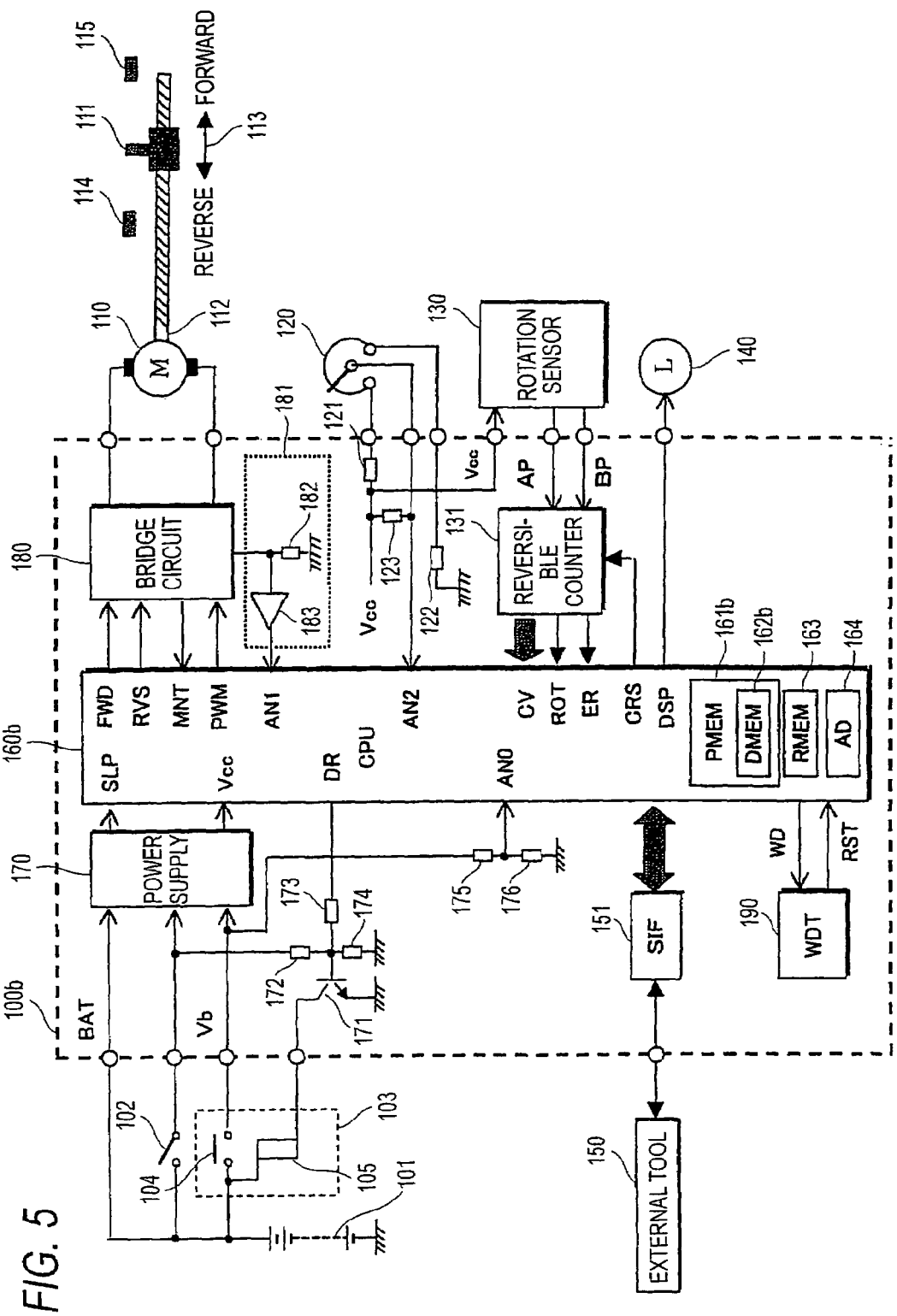
FIG. 5 is an overall block diagram showing a second embodiment of the invention.

In FIG. 5, a vehicle-mounted drive control apparatus 100b operates with a microprocessor 160b, which will be further discussed later, as its main part, and like the apparatus shown in FIG. 1 it is connected by removable connectors (not shown) to a vehicle battery 101, a power supply switch 102, an output contact 104 of a power supply relay 103, an exciting coil 105, a motor 110, a variable resistance 120, a warning display 140, and an external tool 150.

Compared to the apparatus of FIG. 1 there is additionally connected a rotation sensor 130. This rotation sensor 130 operates in linkage with rotation of the motor 110 and generates a 2-phase pulse made up of an A-phase pulse AP and a B-phase pulse BP having a phase difference of 90°, and for example if the logic level of the A-phase pulse AP is 'H' when the B-phase pulse BP changes from the logic level 'L' to 'H' then it is determined that the motor 110 is rotating forward, and if the logic level of the A-phase pulse AP is 'L' it is determined that the motor 110 is rotating in reverse.

Next, as the internal construction of the vehicle-mounted drive control apparatus 100b, in cooperation with a program memory 161b, which is for example a nonvolatile flash memory, a data memory 162b, which is an area of the program memory 161b divided from the rest and erasable en bloc, a RAM memory for processing 163, and a multichannel AD-convertor 164, the microprocessor 160b performs pulse width modulation control of the motor 110.

Compared to the apparatus of FIG. 1 there is additionally provided a reversible counter 131, and this reversible counter 131 performs a reversible counting operation on the basis of the A-phase pulse AP and the B-phase pulse BP, which it inputs from the rotation sensor 130, and thereby detects the present position of the moving body 111.

The present count value CV of the reversible counter 131 is inputted to the microprocessor 160b, and the present value of the reversible counter 131 is initialized to 0 by a reset command output CRS generated by an origin-setting operation that will be further discussed later.

The reversible counter 131 also includes a failure determining function, and when while the logic level of either one of the A-phase pulse AP and the B-phase pulse BP is alternating the logic level of the other is not changing, it generates a wire-break/short-circuit failure detection signal ER and inputs it to the microprocessor 160b.

And when the logic levels of both the A-phase pulse AP and the B-phase pulse BP are alternating, is generates a rotation detection signal ROT and inputs it to the microprocessor 160b.

In a drive control apparatus constructed as described above, predetermined control programs and control constants from the external tool 150 are stored in advance in the program memory 161b and the data memory 162b, and on the basis of these control programs and control constants the microprocessor 160b determines a target position of the moving body 111 and controls the duty ratio of the transistors in the transistor bridge circuit 180 constituting the driving circuit so that the actual position of the moving body 111 approaches this target position.

Figure 6:
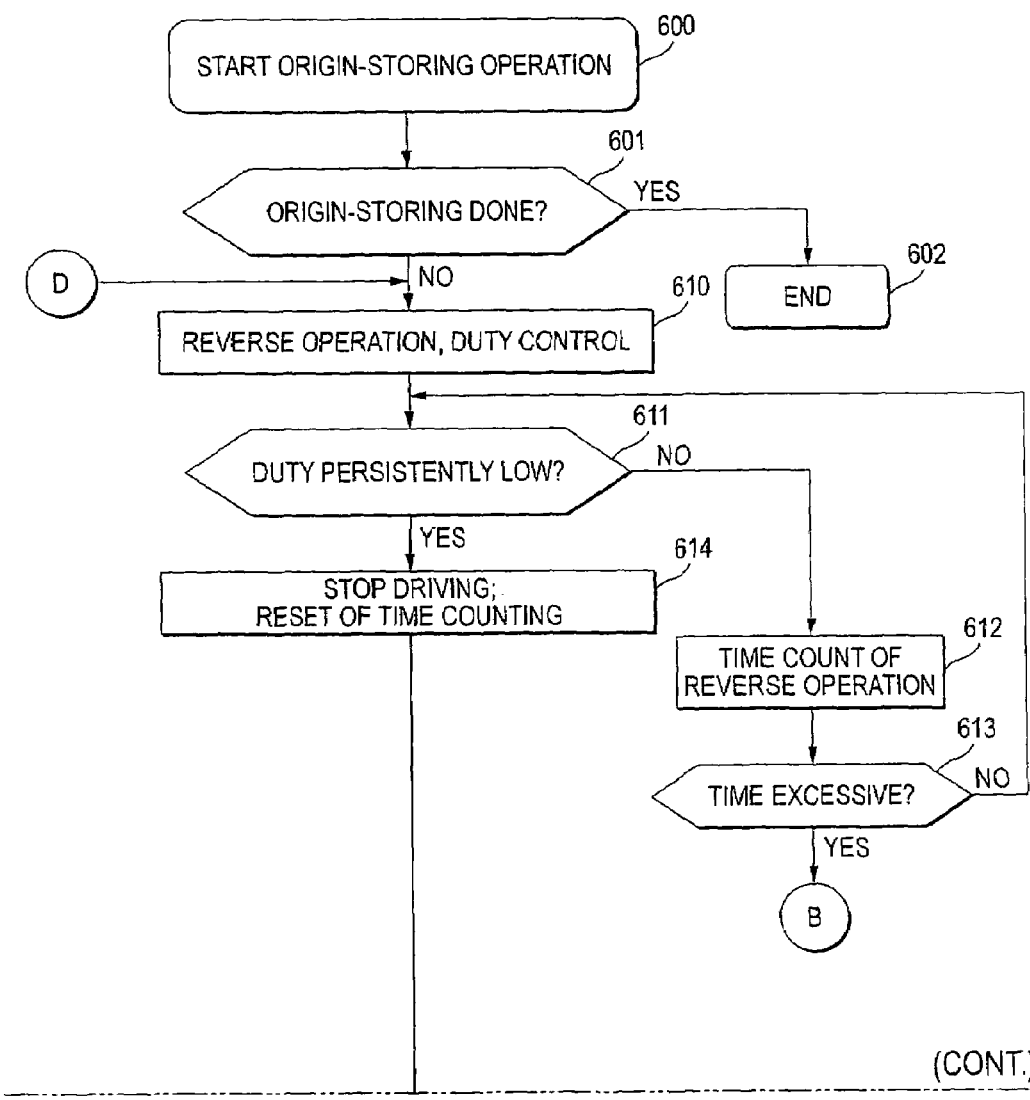
FIG. 6 is a flow chart illustrating an origin return operation of the second embodiment.

However, to check the relative positional relationship between the variable resistance 120 and the moving body 111, which are linked to the motor 110, and the relative positional relationship between the present value of the reversible counter 131 and the moving body 111, before the product is shipped, origin-storing processing is carried out along the lines of FIG. 6 and position data on the moving body 111 inputted through the analog input terminal AN2 and the present value of the reversible counter 131 are calibrated.

Figure 8B:
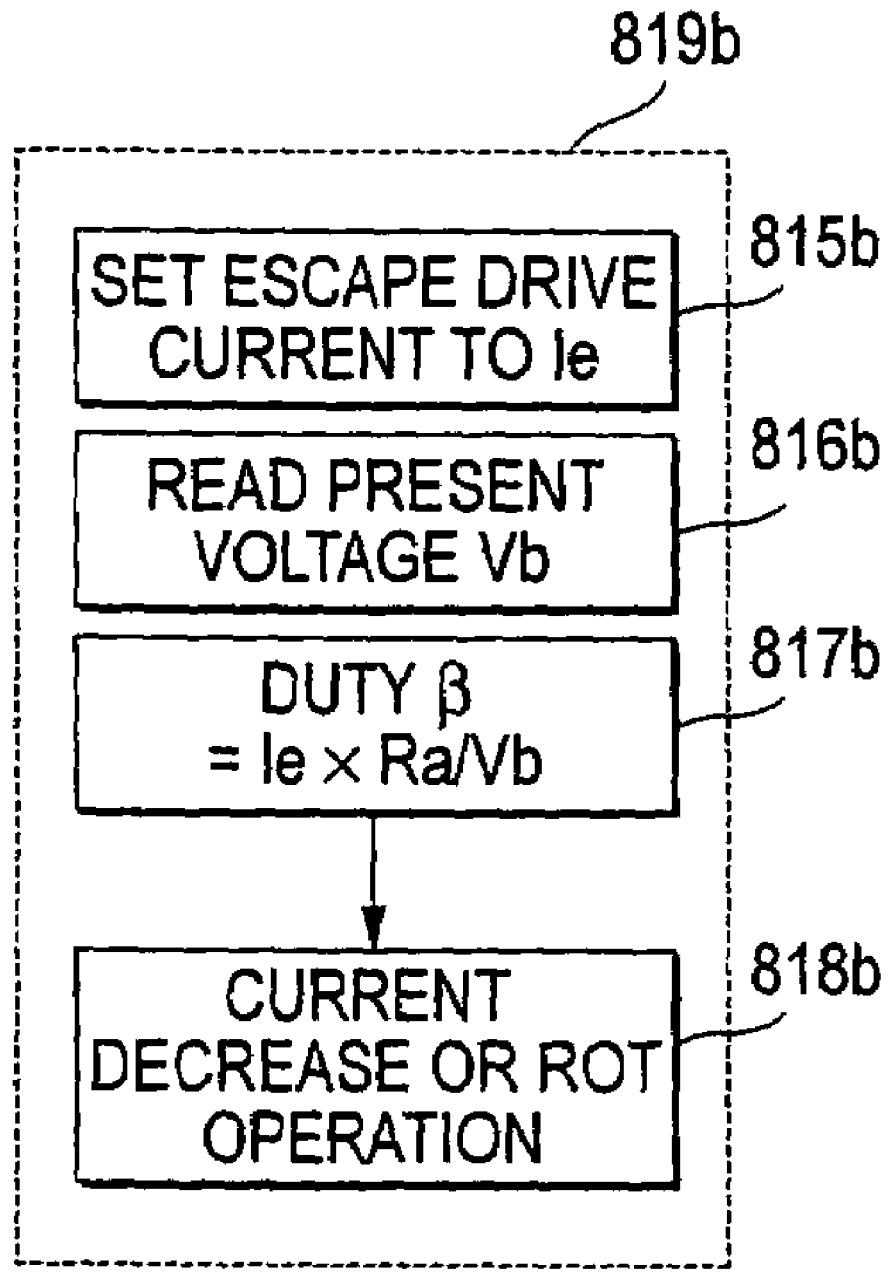
Figure 9:
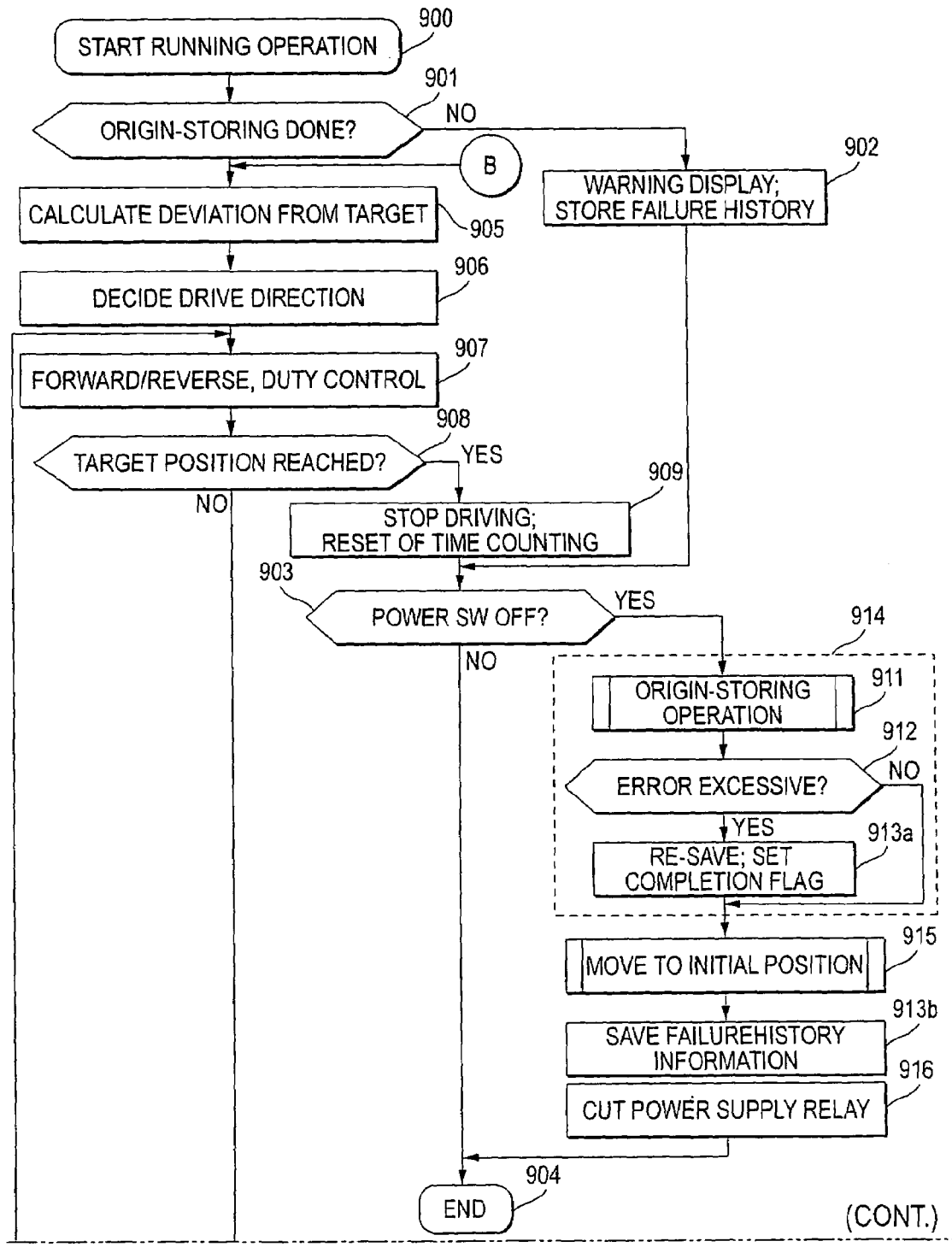
FIG. 9 is a flow chart illustrating a normal running operation of the second embodiment.

Normal running control carried out after the origin-storing processing is performed is as shown in FIG. 9, and duty control of the transistors in FIG. 6 and FIG. 9 is as shown in FIGS. 8A and 8B.

The value of the power supply voltage Vb of the vehicle battery 101 and the value of the motor current Im of the motor 110 inputted through the analog input terminals AN0, AN1 are used for controlling the duty ratio of the transistors.

When the microprocessor 160b has run away due to a noise malfunction or the like, the watchdog timer 190 operates and initializes and restarts the microprocessor 160b.

When a wire-break/short-circuit failure in the transistor bridge circuit 180 or the motor 110 and its connection circuit occurs and is inputted to the wire-break/short-circuit monitoring input terminal MNT, the warning display 140 is operated by a warning/display output DSP.

When the voltage level of the analog input terminal AN2 is outside the range of 0.5 to 4.5V, it is inferred that there is a defective contact/wire-break/short-circuit failure of the variable resistance 120 or its connection wiring and a warning/display output DSP operates the warning display 140.

Similarly, when the wire-break/short-circuit failure detection signal ER is produced, it is inferred that there is a wire-break/short-circuit failure of the rotation sensor 130 or its connection wiring and the warning display 140 is operated by way of the warning/display output DSP.

Figure 7:
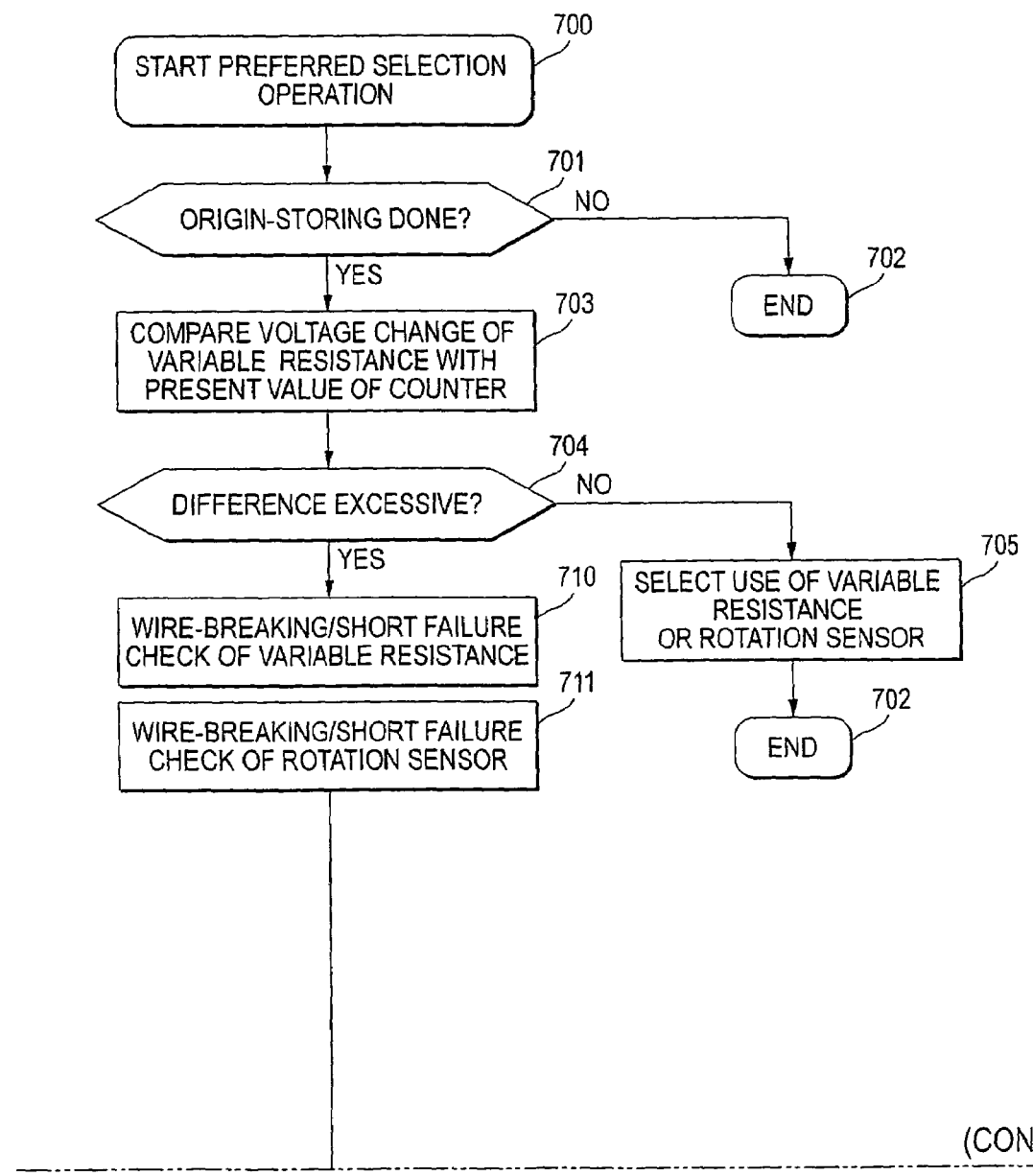
FIG. 7 is a flow chart illustrating a good source selecting operation of the second embodiment.

However, in this embodiment the variable resistance 120 and the rotation sensor 130 serving as movement position detecting means of the moving body 111 are installed as a double system, and when a failure occurs in either one of them, running enabled by good source selecting means shown in FIG. 7 can be continued.

The reversible counter 131 including the failure determining function can alternatively be realized not as hardware like that shown in FIG. 5 but as software based on a counting program held in the program memory 161b and the microprocessor 160b.

FIG. 6, which is a flow chart for illustrating an origin return operation of the apparatus shown in FIG. 5, will now be explained.

In FIG. 6, a step 600 is a step of the microprocessor 160b starting an origin-storing operation, and the following step 601 is a step of reading whether or not an origin-setting completion flag has been set in a step 657 which will be discussed later and thereby determining whether or not origin-storing has been done. When the determination of this step 601 is YES and thus storing is finished, processing proceeds to a routine-ending step 602, and when the determination of step 601 is NO and thus origin-storing has not been carried out, processing proceeds to step 610.

In step 610 the reverse command output RVS is generated and the pulse width modulation control output PWM is supplied to the transistor on the opposite side.

The duty ratio $\gamma$ ($=\tau on/\tau$) in step 610 is feedback-controlled so that the motor current Im of the motor 110 inputted through the analog input terminal AN1 approaches a target current Is, and the rated current of the motor 110 is used as the target current Is.

Step 611 executed after step 610 is locked state detecting means for determining that due to the speed of the motor 110 having fallen the drive voltage for bringing the motor current Im to the target current Is has fallen and the duty ratio $\gamma$ has fallen below a predetermined value.

When the determination of step 611 is NO and thus the duty ratio $\gamma$ is not overly low or it is immediately after starting, step 612 is executed and timing of a reverse operation time is started by a timer (not shown), and in the following step 613 it is determined whether or not the reverse operation time is excessive, and if it is not excessive processing returns to step 611 and if the time is excessive processing proceeds to step 660, which will be discussed later.

When the determination of step 611 is YES and for example the moving body 111 has hit the reverse limit stopper 114 and stopped and the duty ratio $\gamma$ has decreased, step 614 is executed and the reverse command output RVS and the control output PWM are stopped and the reverse timer started in step 612 is stopped and the timer is reset.

In the following step 615 the present value of the reversible timer 131 is made 0 by the reset command output CRS and the detection output of the variable resistance 120 inputted to the analog input terminal AN2 is provisionally held at a first address D1 of the RAM memory 163, and this provisionally stored value is tentatively taken as the reverse limit position enforced by the reverse limit stopper 114; however, the possibility must be considered that actually the motor 110 stopped and step 611 detected a low duty ratio because an abnormal load arose before the reverse limit stopper 114 was reached.

In step 620 executed after step 615 the forward command output FWD is generated and the pulse width modulation control output PWM is supplied to the transistor on the opposite side.

The duty ratio $\gamma$ ($=\tau on/\tau$) in step 620 is feedback-controlled so that the motor current Im of the motor 110 inputted through the analog input terminal AN1 approaches a target current Is, and the rated current of the motor 110 is used as the target current Is.

Step 621 executed after step 620 is locked state detecting means for determining that due to the speed of the motor 110 having fallen the drive voltage for bringing the motor current Im to the target current Is has fallen and the duty ratio γ has fallen below a predetermined value.

When the determination of step 621 is NO and thus the duty ratio γ is not overly low or it is immediately after starting, step 622 is executed and timing of a forward operation time is started by a timer (not shown), and in the following step 623 it is determined whether or not the forward operation time is excessive, and if it is not excessive processing returns to step 621 and if the time is excessive processing proceeds to step 660, which will be discussed later.

When the determination of step 621 is YES and for example the moving body 111 has hit the forward limit stopper 115 and stopped and the duty ratio γ has decreased, step 624 is executed and the forward command output FWD and the control output PWM are stopped and the forward timer started in step 622 is stopped and the timer is reset.

In the following step 625 the detection output of the variable resistance 120 inputted to the analog input terminal AN2 is provisionally held at a second address D2 of the RAM memory 163 and the present value CV of the reversible timer 131 is provisionally held at a third address D3.

The provisionally stored value of step 625 is tentatively taken as the forward limit position enforced by the forward limit stopper 115; however, the possibility must be considered that actually the motor 110 stopped and step 621 detected a low duty ratio because an abnormal load arose before the forward limit stopper 115 was reached.

In a step 630 executed following step 625, the difference between the value of the data D1 provisionally stored in step 615 and the value of the data D2 provisionally stored in step 625 is calculated, and a comparative determination is made of whether or not this difference value is approximately the same as the data relating to an overall movement distance pre-stored in the program memory 161b or the data memory 162b.

Similarly, in step 630 a comparative determination is made of whether or not the value of the data D3 provisionally stored in step 625 and data relating to a counter count value corresponding to the overall movement distance pre-stored in the program memory 161b or the data memory 162b are approximately the same.

Step 631 is an escape drive step executed when the determination of step 630 is NO and thus the output change of the variable resistance 120 and the count value of the reversible timer 131 were not as they should be.

In step 631 the forward command output FWD is generated and the pulse width modulation control output PWM is supplied to the transistor on the opposite side, and the duty ratio is alternately made 0 or a very small value δ and made a γ explained below and intermittent driving is thereby carried out.

The duty ratio γ is feedback-controlled so that the motor current Im of the motor 110 inputted through the analog input terminal AN1 approaches a predetermined escape drive current Ie greater than the rated current but less than a locked rotor current.

In the following step 632, while intermitting driving of the motor 110 is carried out the intermitting driving time is timed, and in the following step 633 it is determined whether or not the intermittent driving time has risen above a predetermined limit time, and if it has not exceeded the time then processing proceeds to step 634 and if it has exceeded the time then the intermittent drive timer is reset and processing proceeds to step 640.

In step 634 it is determined whether or not the drive current has decreased as a result of the motor 110 starting to rotate, and if no current decrease is seen processing returns to step 631 and continues intermittent driving, and when a current decrease has occurred the intermittent drive timer started in step 632 is reset and processing returns to step 620.

By step 620, forward drive is carried out again, and when eventually the motor 110 stops at the position of the forward limit stopper 115 processing proceeds through steps 621, 624 and 625 to step 630, and when the determination of step 630 becomes YES and thus it is inferred that the change of the variable resistance 120 and the present value of the reversible timer 131 are as they should be processing proceeds to step 655.

In step 640 executed when the determination of step 633 was YES, the reverse command output RVS is generated and the pulse width modulation control output PWM is supplied to the transistor on the opposite side.

The duty ratio γ (=τon/τ) in step 640 is feedback-controlled so that the motor current Im of the motor 110 inputted through the analog input terminal AN1 approaches a target current Is, and the rated current of the motor 110 is used as the target current Is.

Step 641 executed after step 640 is locked state detecting means for determining that due to the speed of the motor 110 having fallen the drive voltage for bringing the motor current Im to the target current Is has fallen and the duty ratio γ has fallen below a predetermined value.

When the determination of step 641 is NO and thus the duty ratio γ is not overly low or it is immediately after starting, step 642 is executed and timing of a reverse operation time is started by a timer (not shown), and in the following step 643 it is determined whether or not the reverse operation time is excessive, and if it is not excessive processing returns to step 641 and if the time is excessive processing proceeds to step 660, which will be discussed later.

When the determination of step 641 is YES and for example the moving body 111 has hit the reverse limit stopper 114 and stopped and the duty ratio γ has decreased, step 644 is executed and the reverse command output RVS and the control output PWM are stopped and the reverse timer started in step 642 is stopped and the timer is reset.

In the following step 645 the detection output of the variable resistance 120 inputted to the analog input terminal AN2 is newly provisionally held at the first address D1 of the RAM memory 163 and the present value CV of the reversible timer 131 is provisionally stored at a fourth address D4.

The provisionally stored value of step 645 is tentatively taken as the reverse limit position enforced by the reverse limit stopper 114; however, the possibility must be considered that actually the motor 110 stopped and step 641 detected a low duty ratio because an abnormal load arose before the reverse limit stopper 114 was reached.

In a step 650 executed following step 645, the differences between the values of the data D2, D3 provisionally stored in step 625 and the values of the data D1, D4 provisionally stored in step 645 are calculated, and a comparative determination is made of whether or not these difference values are approximately the same as the data relating to an overall movement distance pre-stored in the program memory 161b or the data memory 162b.

Step 651 is an escape drive step executed when the determination of step 650 is NO and thus the output change of the variable resistance 120 and the count value of the reversible timer 131 were not as they should be.

In step 651 the reverse command output RVS is generated and the pulse width modulation control output PWM is supplied to the transistor on the opposite side, and the duty ratio is alternately made 0 or a very small value δ and made a γ explained below and intermittent driving is thereby carried out.

The duty ratio γ is feedback-controlled so that the motor current Im of the motor 110 inputted through the analog input terminal AN1 approaches a predetermined escape drive current Ie greater than the rated current but less than a locked-rotor current.

In the following step 652, while intermittent driving of the motor 110 is carried out the intermitting driving time is timed, and in the following step 653 it is determined whether or not the intermittent driving time has risen above a predetermined limit time, and if it has not exceeded the time then processing proceeds to step 654 and if it has exceeded the time then the intermittent drive timer is reset and processing proceeds to step 660.

In step 654 it is determined whether or not the duty ratio γ has increased as a result of the motor 110 starting to rotate, and when no increase in duty ratio is seen processing returns to step 651 and continues intermittent driving, and when a duty ratio increase has occurred the intermittent drive timer started in step 652 is reset and processing returns to step 640.

By step 640, reverse drive is carried out again, and when eventually the motor 110 stops at the position of the reverse limit stopper 114 processing proceeds through steps 641, 644 and 645 to step 650, and when the determination of step 650 becomes YES and thus it is inferred that the change of the variable resistance 120 and the present value of the reversible timer 131 are as they should be processing proceeds to step 655.

In step 655 the data D1, D2 are stored finally and the absolute values of the present counter value D3 at the forward position stored in step 625 and the present counter value D4 at the reverse position stored in step 645 are added together and newly stored at the third address D3.

In the following step 656 the values of the data D1, D2, D3 are transferred and saved to the nonvolatile data memory 162b, in step 657 the set state of an origin-setting completion flag is transferred and saved to the nonvolatile data memory 162b, and then processing proceeds through a step block 658 to the routine-ending step 602.

The step block 658 is a step block for moving the position of the moving body 111 to an initial position which is for example the mid-point between the forward limit stopper 115 and the reverse limit stopper 114.

In step 660 executed when a timeout determination has been made in step 613, 623, 643 or 653, the forward or reverse drive is stopped and the timer is reset, and in a failure analysis step 661 executed next it is distinguished whether the timeout determination occurred in step 613, 623 or 643, or occurred in step 653.

When the timeout occurred in step 653, the determination in the following step 662 is YES and processing proceeds to step 610 to execute the origin return operation again.

When the timeout occurred in step 613, 623 or 643, or when it is after the origin return operation has been carried out again, the determination of step 662 becomes NO and step 663 is executed, and a failure warning is displayed and a failure history is stored in the RAM memory 163.

Summarizing the main points of the operation described above, step 600 is a starting step of origin-storing processing means; steps 610, 620, 640 are normal drive control means using current control; steps 631, 651 are escape drive control means using feedback control; steps 611, 621, 641 are locked state detecting means; steps 615, 645 are first provisional storing means; steps 615, 655 are resetting means; step 625 is second provisional storing means; steps 630, 650 are comparative determining means; steps 634, 654 are escape detecting means; step 656 is saving means; and step 663 is failure notification means.

The flow from step 610 to step 615 temporarily reverse-stops the moving body 111 and provisionally stores the output voltage of the variable resistance 120 as data D1 and resets the present value of the reversible timer 131.

The flow from step 620 to step 625 forward-operates the moving body 111 and provisionally stores the output voltage of the variable resistance 120 at a forward stop position as data D2 and provisionally stores the present value of the reversible timer 131 as data D3.

If in step 630 the difference between the output voltages stored as the data D1 and D2 and the present value of the reversible timer 131 provisionally stored as the data D3 are a predetermined value, the origin-setting operation has been successful and saving to the data memory 162b and returning to the initial position are performed by the flow of step 655 to step 658.

The flow of step 631 to step 634 is executed when the difference between the output voltages stored as the data D1 and D2 and the present value of the reversible timer 131 provisionally stored as the data D3 have not reached the predetermined value and thus the movement was insufficient; it effects an escape boosted drive for escaping from an overload state, and if a sufficient movement is obtained and a predetermined amount of movement is achieved the origin-setting operation is successful and saving to the data memory 162a and returning to the initial position are performed by the flow of step 655 to step 658.

However, when part-way through the reverse operation of step 610 to step 615 an overload state has arisen and the moving body 111 has not reversed as far as the position of the reverse limit stopper 114, by the series of operations of from step 620 to step 634 the predetermined amount of movement cannot be reached, and the escape drive of step 631 becomes an action trying to effect a further forward operation at the position of the forward limit stopper 115.

In this case step 633 performs a timeout determination and processing moves to step 640 and by the operation of from step 640 to step 654 an operation of returning to the reverse limit position 114 is carried out, in step 650 the amount of movement is checked again and if it is a correct value the origin-setting operation has been successful and saving to the data memory 162b and returning to the initial position are performed by the flow of step 655 to step 658.

When in the operation of returning to the reverse limit position 114 the moving body 111 stops and even when escape drive control is carried out for a predetermined time the predetermined amount of movement is not reached, a timeout determination is made in step 653 and from step 660 to step 663 are executed and the origin-setting operation is carried out again.

In a hit-and-stop type origin-setting operation like this it is important for it to be determined that the moving body 111 has been stopped by the forward limit stopper 115 or the reverse limit stopper 114 and not stopped as a result of an excessive load, and whether or not origin-setting has been carried out certainly is determined by the checking of the change in the variable resistance 120 and the change in the present value of the reversible timer 131 performed by step 630 and step 650, and when an excessive load has arisen the escape drive of the escape drive control means 631, 651 is carried out.

There is a fixed proportional relationship between the change in the output voltage of the variable resistance 120 and the change in the present value of the reversible timer 131 in step 630 and step 650, and if and when this proportional relationship is not being maintained, the intermittent drive of step 631 and step 651 is not carried out and instead a good source selection shown in FIG. 7 is carried out and then control based on the value of one or the other of the variable resistance 120 and the reversible timer 131 is carried out.

Next, FIG. 7, which is a flow chart illustrating a good source selection operation of the apparatus shown in FIG. 5, will be explained.

In FIG. 7, step 700 is a starting step of good source selection operation of the microprocessor 160b, the following step 701 is a step of determining whether or not origin-setting has been done by reading whether or not the origin-setting completion flag set in step 657 of FIG. 6 or a step 913a which will be discussed later has been set, and when the determination of this step 701 is NO and origin-setting has not been carried out processing proceeds to a routine-ending step 702 and if the determination of step 701 is YES and origin-setting has been carried out processing proceeds to step 703.

In step 703 executed when the determination of step 701 is YES and origin-setting has been done, the output voltage of the variable resistance 120 and the present value CV of the reversible timer 131 are compared.

For example, supposing that with respect to a maximum movement distance L of the moving body 111 from the reverse limit position 114 to the forward limit position 115 the number of operations of the rotation sensor 130 is 100, and that the variable resistance 120 on its own has a maximum operating angle of 320° but when installed has a maximum turn angle of 250° with respect to the maximum movement distance L, and that the output voltage of the variable resistance 120 on its own varies between 0.5 and 4.5V, then the change $\Delta V$ in the output voltage of the variable resistance 120 per 1 pulse of the rotation sensor 130 is given by the following expression:

$$\Delta V=[(4.5-0.5)\times 250/320]/100=31.25 \text{ mV/pulse}$$

Therefore, the maximum voltage change of the variable resistance 120, which is the value of the difference between the data D2 and D1 confirmed in step 655 of FIG. 6, is proportional to the value of 31.25 times the data D3, which is the maximum count value of the reversible timer 131.

In the following step 704 if the comparison difference of step 703 is small then processing proceeds to step 705, and if the comparison difference is excessive to above a predetermined threshold value then processing proceeds to step 710.

In step 705 either the output voltage of the variable resistance 120 or the present value CV of the reversible timer 131 counting pulses generated by the rotation sensor 130 is selected as the position detecting means of the moving body 111, and in the flow chart of FIG. 9 it is assumed that the rotation sensor 130 has been selected.

In step 710 a check of whether or not the output voltage of the variable resistance 120 is in the range of 0.5 to 4.5V, and whether or not the change between the output voltage at time of the previous detection and the output voltage detected this time after a fixed time is excessive, and it is thereby checked whether or not there is defective contact of the variable resistance 120 or a wire-break or short-circuit failure of connection wiring.

In the following step 711, the logic state of a wire-break/short-circuit failure detection signal ER pertaining to the reversible timer 131 is monitored, and it is thereby checked whether or not there has been a failure including the rotation sensor 130 and the reversible timer 131.

In step 712 executed following step 711, if the check result of step 710 is that the variable resistance 120 has failed, processing proceeds to step 713a, and if no failure of the variable resistance 120 is discovered processing proceeds to step 713b.

In step 713a and step 713b a branching operation is carried out on the basis of the result of the failure check of the rotation sensor 130.

Step 714a is executed when step 712 has determined that the variable resistance 120 has failed and step 713b has determined that the rotation sensor 130 is normal, and decides the selection and use of the rotation sensor 130.

Step 714b is executed when step 712 has determined that the variable resistance 120 is normal and step 713b has determined that the rotation sensor 130 has failed, and decides the selection and use of the variable resistance 120.

Step 715 is executed when step 712 has determined that the variable resistance 120 has failed and step 713a has determined that the rotation sensor 130 has failed, or when step 712 has determined that the variable resistance 120 is normal and step 713b has determined that the rotation sensor 130 is normal, and resets the origin-setting completion flag set in step 657 of FIG. 6.

In step 716 executed following step 714a, 714b or step 715, if there has been a failure of either the variable resistance 120 or the rotation sensor 130 or both, the warning display 140 is operated and a failure history is written in the RAM memory 163 before processing proceeds to a routine-ending step 702.

In the routine-ending step 702, the microprocessor 160b performs other control operations before going back to the operation-starting step 700 again, and the good source selection control is executed at roughly fixed intervals.

Summarizing the main points of the operation described above, step 700 is a starting step of good source selecting means, step 703 is comparing means, step 710 is first failure detecting means, step 711 is second failure detecting means, and if the variable resistance 120 or the rotation sensor 130 have both failed, or if they are both normal but do not agree with each other when compared, the origin-setting completion flag is reset.

As a result, via steps 901 and 903 of FIG. 9 the origin-storing/confirming processing of step block 914 is carried out.

Next, FIGS. 8A and 8B, which are flow charts illustrating duty control operation of the apparatus of FIG. 5, will be explained.

In FIG. 8A, which is an overall flow chart of the duty control, step 800 is a start step of duty control operation of the microprocessor 160b, the following step 801 is a step of determining whether or not there has been a failure of the drive circuitry by determining the logic level of the wire-break/short-circuit monitoring signal MNT relating to the drive transistors of the transistor bridge circuit 180 and the motor 110 and its connection wiring, and when the determination of step 801 is that there has been a failure step 802 is executed and failure notification by the warning display 140 and storing of failure history information in the RAM memory 163 are carried out before processing proceeds to step 803, in step 803 the duty ratio is made 0 before processing proceeds to a routine-ending step 804, and in step 804 other control operations are carried out before processing cycles to step 800 again.

When the determination of step 801 is that there has been no failure step 805 is executed, in step 805 a determination of whether or not to carry out forward/reverse operation is made on the basis of the difference between the target position of the moving body 111 and its present position, when forward/reverse operation is not to be carried out processing proceeds to step 803 and makes the duty ratio 0, and when forward/reverse operation is to be carried out processing proceeds to step 806 and generates a forward command output FWD or reverse command output RVS.

In step 810 executed after step 806 it is determined whether or not the rotation detection signal ROT is in a rotation-stopped state after a predetermined time from starting, and when rotation has stopped processing proceeds to step 815a, and at the time of a first operation when a duty ratio has not yet been decided, or immediately after the motor 110 starts to be driven, processing proceeds to step 811.

In step 811 a target current Is, which is for example the rated current of the motor 110, is set, in the following step 812 the motor current Im of the motor 110 inputted to the analog input terminal AN1 is read out, in the following step 813 a duty ratio γ is feedback controlled so that the motor current Im approaches the target current Is, and the step block 814 made up of steps 811, 812 and 813 constitutes normal drive control means using feedback control.

In step 813, so that the motor speed does not become excessive, the duty ratio α shown in step 313 of FIG. 3A is also calculated, and the duty ratio γ is limited to γ<α.

In step 815a an escape drive current Ie is set, in the following step 816a the present motor current Im is read out, in the following step 817a feedback control is carried out to control the size of the duty ratio γ so that the motor current Im approaches the escape drive current Ie, and in the following step 818a a check is made of whether the duty ratio γ necessary for obtaining the escape current Ie has risen due to an increase in the speed of the motor 110 or the rotation detection signal ROT is monitored for whether the motor 110 has started rotating.

The step block 819a made up of from step 815a to step 818a constitutes boosted drive means using feedback control in which the duty ratio γ varies with the speed of the motor.

When in step 820 it is determined as the result of the check in step 818a that the motor 110 has started rotating, processing proceeds to step 811, and when it has still not started rotating processing proceeds to step 821.

In step 821, which is for deciding a boosted drive period, the elapsed time from when the boosted drive of the step block 819a started is determined, and for example if the elapsed time is not greater than 0.1 seconds processing returns to step 815a and continues boosted drive, and when it exceeds 0.1 seconds processing proceeds to step 822.

In step 822 the duty ratio is made 0 or setting to provide a small holding current is carried out and then processing proceeds to step 823.

In step 823, which is for deciding a rest period, the elapsed time of resting drive started in step 822 is determined, and for example if the elapsed time is not greater than 0.9 seconds processing returns to step 822 and continues the resting drive, and when it rises above 0.9 seconds processing proceeds to step 824.

In step 824 it is determined whether or not intermittent drive made up of boosted drive performed by the step block 819a and resting drive performed by step 822 has taken place not more than for example ten times, and if not more than ten times processing proceeds to step 815a and continues intermittent drive, and when it rises above ten times processing proceeds to step 826 and failure notification with the warning display 140 and write-saving of a failure history to the RAM memory 163 are carried out, and then processing proceeds to the routine-ending step 804.

The step block 825 made up of from step 815a to step 824 constitutes escape drive control means, and to not carry out intermittent escape drive but to carry out continuous escape drive instead it is only necessary to make the escape drive current Ie set in step 815a a slightly low value and change the determination time of step 821 to for example 5 seconds and proceed directly to step 826 when the time excessive determination is made in step 821.

In FIG. 8B, which shows another embodiment of the boosted drive means 819a, an escape drive current Ie is set in a step 815b, in the following step 816b the present power supply voltage Vb is read out, in the following step 817b β=Ie×Ra/Vb is set as a duty ratio β, in the following step 818b a check is made of whether the motor current has decreased or the rotation detection signal ROT is monitored for whether the motor 110 has started rotating, and then processing proceeds to step 820, which is escape detecting means.

Ra is the armature resistance of the motor 110, and the step block 819b made up of from step 815b to step 818b constitutes boosted drive means using limit control maintaining a fixed duty ratio β irrespective of the speed of the motor.

Summarizing the main points of the operation described above, step 810 is locked state detecting means, step block 814 is normal drive control means using current control, step block 819a is boosted drive means using feedback control keeping the motor current at a predetermined value, step block 819b is boosted drive means using limit control for controlling to a fixed duty ratio irrespective of the speed of the motor, step 820 is escape detecting means, step 821 is a boosted drive period, step 823 is a rest period, step 825 is escape drive control means, and step 826 is failure notification means.

The normal drive control means 610, 620, 640 in FIG. 6 are in detail what is shown in the step block 814, and the escape drive control means 631, 651 in FIG. 6 are based on the step block 825.

And, the normal drive control means 814 can be replaced with the normal drive control means 314 using voltage control shown in FIG. 3A, and conversely the normal drive control means 314 of FIG. 3A can be replaced with the normal drive control means 814 using current control.

Also, in the locked state detecting means 810 and the escape detecting means 820, the locked state or rotating state may be determined by whether or not there has been a change in the output voltage of the variable resistance 120.

Next, FIG. 9, which is a flow chart illustrating normal running operation of the apparatus of FIG. 5, will be explained.

In FIG. 9, step 900 is a step of the microprocessor 160b starting normal running operation of the motor 110, the following step 901 is a step of determining whether or not origin-storing has been done by reading whether or not the origin-setting completion flag has been set in step 657 of FIG. 6 or a step 913a discussed below, and when the determination of step 901 is YES and origin-storing has been done processing proceeds to step 905 and when the determination of step 901 is NO and origin-storing has not been done processing proceeds to step 902.

The origin-setting operation of FIG. 6 is executed on a product shipping line at the manufacturer, and because in normal running mode it is abnormal for origin-setting not to have been completed, in step 902 failure notification by the warning display 140 and writing of history information to the RAM memory 163 are carried out.

In step 903 executed after step 902 it is determined whether or not the power supply switch 102 has been turned off, and if it is still on then processing proceeds to a routine-ending step 904.

After the microprocessor 160b carries out other control operations in the routine-ending step 904 the operation starting step 900 is activated again and when in the course of steps 900, 901, 902, 903 and 904 being cyclically executed step 903 detects that the power supply switch 102 is off, processing proceeds to a step block 911.

The step block 911 is the overall routine of the origin-storing processing operation shown in FIG. 6, and this step block is executed whenever the power supply switch 102 is turned off, as will be further discussed later.

In a step 912 executed after that it is determined whether or not origin calibration information already saved and the origin calibration information newly obtained agree, and if the error between them is excessive or there is no existing information then step 913a is executed and the new information and setting information of the origin-setting completion flag reset by step 715 of FIG. 7 are saved in the data memory 162b.

A step block 914 is made up of the step block 911 and steps 912 and 913a and constitutes origin-storing/confirming means.

A step block 915 executed when the determination of step 912 is that the error is small or following step 913a constitutes a running operation step of moving the moving body 111 in advance with an initial position of the moving body 111 as of when running is restarted as a target position.

Step 913b executed after that is a step of transferring and saving to the data memory 162b the failure history information that has been write-saved in the RAM memory 163 during running, the next step 916 is a step of stopping the driving output DR of the microprocessor 160b before moving to the routine-ending step 904, and when the driving output DR is stopped the self-holding transistor 171 turns off and the power supply relay 103 is de-energized and the supply of power to the vehicle-mounted drive control apparatus 100b is stopped.

When the determination of step 901 is that origin-storing has been done step 905 is executed, and in step 905 the deviation between the movement target position and the present position of the moving body 111 converted into an output voltage of the variable resistance 120 or a present value CV of the reversible timer 131, and its sign, are calculated.

In the following step 906 a rotation direction of the motor 110 is decided in accordance with the sign of the deviation calculated in step 905, and a forward command output FWD or a reverse command output RVS is generated.

In the following step 907 a pulse width modulation control output PWM is supplied to the transistor opposite the transistor turned on by the forward command output FWD or reverse command output RVS.

The duty ratio $\gamma$ ($=\tau on/\tau$) in step 907, which constitutes normal drive control means, is a value not greater than $\alpha=Vs/Vb$, the ratio of a drive voltage Vs suited to an upper limit speed of the motor 110 and the power supply voltage Vb of the vehicle battery 101 inputted through the analog input terminal AN0, and is feedback-controlled so that a predetermined target current is obtained.

Control that makes the upper limit speed of the motor 110 its rated speed when the positional deviation is large and gradually reduces the speed as the target position is neared is usual.

In step 908 executed following step 907 it is determined whether or not the moving body 111 has reached the target position, and if it has reached the target position step 909 is executed and driving of the motor 110 is stopped and a timer started in step 917, discussed below, is reset, and then processing proceeds via step 903 to the routine-ending step 904.

However, if when step 903 is executed the power supply switch 102 is off then the step blocks 914 and 915 and steps 913b and 916 are executed before processing proceeds to the routine-ending step 904.

When the determination of step 908 is NO and the target position has not been reached then step 917 is executed and a drive time timer is started, and in the following step 918 it is determined whether or not this timer has reached time up, and if the determination is that the time is excessive processing proceeds to step 960, and if the determination of step 918 is that the time is not excessive step 920a is executed.

In step 920a, whether or not the motor speed has fallen and the duty ratio $\gamma$ has decreased, or the logic level of the rotation detection signal ROT, is monitored.

Step 920b, which is locked state detecting means, is executed after step 920a, and determines whether or not step 920a detected a locked/stopped state of the motor 110, and when the motor 110 has not stopped processing returns to step 907 and continues driving the motor 110, and when it determines that the motor 110 has locked/stopped it resets the timer started in step 917 and then proceeds to step 921.

In step 921, which constitutes escape drive control means, the intermittent drive shown in step block 825 of FIG. 8A is carried out, and in the following step 922 the intermittent drive time is timed while intermittent driving of the motor 110 is carried out, and in the following step 923 it is determined whether or not the intermittent drive time has exceeded a predetermined limit time, and if it has not exceeded the time then processing proceeds to step 924a and if it has exceeded the time then processing proceeds to step 960.

In step 924a, as in step 920a, whether or not the motor 110 is rotating is checked by monitoring an increase in the duty ratio $\gamma$ or the logic level of the rotation detection signal ROT.

Step 924b, which constitutes escape detecting means, is executed following step 924a, and determines on the basis of the detection result of step 924a whether or not the motor 110 has started rotating, and when the motor 110 is still not rotating processing returns to step 921 and continues escape driving of the motor 110, and when it is determined that the motor 110 has started rotating the timer started in step 922 is reset and processing proceeds to step 907.

In step 960 executed when a timeout determination is made in step 918 or 923, forward or reverse driving is stopped and the timer is reset, and in the failure analysis step 961 executed after that it is distinguished whether the timeout determination occurred in step 918 or occurred in step 923.

When the timeout occurred in step 923 the determination of the following step 962 is YES and processing proceeds to step 963.

In step 963, the motor 110 is oppositely driven in the opposite rotation direction to hitherto, and in the following step 964 it is determined whether or not the opposite drive time of step 963 has exceeded a predetermined value, or whether or not the output voltage of the variable resistance 120 or the present value CV of the reversible timer 131 is above a predetermined threshold value, and if opposite operation is incomplete processing returns to step 963 and continues opposite drive, and if a predetermined small opposite drive has completed then processing returns to step 905 and the operation of driving to the target position is started again.

When the timeout occurred in step 918, or when it is after running operation has been carried out again, the determination of step 962 is NO and step 965 is executed, a failure warning display is carried out and a failure history is stored in the RAM memory 163.

Summarizing the main points of the operation described above, step 907 is normal drive control means, step 911 is origin-storing processing means, step 914 is origin-storing/confirming means, step 920b is locked state detecting means, step 921 is escape drive control means, step 924b is escape detecting means, step 963 is opposite driving means and step 965 is failure notification means.

The normal drive control means 907 is in detail as shown in step block 814 of FIG. 8A, and the escape drive control means 921 is in detail as shown in step block 825 of FIG. 8A.

And, in the locked state detecting means 611, 621, 641 in FIG. 6 and the locked state detecting means 810 in FIG. 8A the determination can be made on the basis of a decrease in duty ratio or the logic level of the rotation detection signal ROT or a stop of changing of the variable resistance 120, as in step 920b, and in the escape detecting means 634, 654 in FIG. 6 and the escape detecting means 820 in FIG. 8A the determination can be made on the basis of a start of changing of the variable resistance 120 or an increase in duty ratio γ or the logic level of the rotation detection signal ROT, as in step 924b.

As is clear from the foregoing explanation, the vehicle-mounted drive control apparatus 100b of this second embodiment of the invention is a vehicle-mounted drive control apparatus 100b for drive-controlling a motor 110 supplied with reversible power from a vehicle battery 101 through switching devices constituting a driving circuit 180 and reversibly driving a moving body 111 between a forward limit position 115 and a reverse limit position 114, and this vehicle-mounted drive control apparatus 100b has a microprocessor 160b cooperating with a nonvolatile program memory 161b and a nonvolatile data memory 162b and a RAM memory for processing 163 and also has moving body position detecting means and good source selecting means and normal drive control means and motor locked state detecting means and escape drive control means and escape detecting means.

The moving body position detecting means is means for performing calibration at an origin position with respect to the output voltage of a variable resistance 120 linked to rotation of the motor 110 or the present value of a reversible timer 131 reversibly counting pulses from a rotation sensor 130 and detecting the position of the moving body 111 relative to the forward limit position 115 and the reverse limit position 114 by monitoring at least one of the values.

The good source selecting means 700 has first failure detecting means 710 for detecting any defective contact of the variable resistance 120 or wire-break or short-circuit of its wiring, second failure detecting means 711 for detecting any wire-break or short-circuit of internal or external wiring of the rotation sensor 130, and relative comparing means 703 for determining whether or not a value proportional to a change in the output voltage of the variable resistance 120 and a change of the present value of the rotation sensor 130 are substantially the same, and when the determination of the relative comparing means 703 is that they are not the same and one of the first and second failure detecting means 710, 711 is detecting an abnormal state, the other source not being detected as abnormal is selected as a good source, and when the relative comparing means 703 determines that they are not the same but the first and second failure detecting means 710, 711 are both detecting a normal state it determines that there is no good source, and the moving body position detecting means detects the position of the moving body 111 relative to the forward limit position 115 and the reverse limit position 114 on the basis of the variable resistance 120 or rotation sensor 130 determined to be a good source.

The normal drive control means 814 is current control means for controlling a duty ratio γ of the switching devices so that even if the power supply voltage of the vehicle battery 101 fluctuates the current supplied to the motor 110 detected by the current-detecting circuit 181 is substantially constant.

The locked state detecting means 810 is means for detecting that the motor 110 is not rotating even though power is being supplied to the motor 110.

The escape drive control means 825 is means for, acting when the moving body position detecting means 120, 130 are detecting a position other than the forward limit position 115 and the reverse limit position 114 and the motor 110 locked state detecting means 810 is detecting a locked state of the motor 110, controlling a duty ratio γ of the switching devices to continuously or intermittently pass a predetermined escape drive current Ie above the rated current of the motor 110 for a period of up to a predetermined time.

The escape detecting means 820 is means for detecting that the motor 110 being driven by the escape drive control means 825 has started rotating, and shifting to the normal drive control means 814.

Accordingly, with the vehicle-mounted drive control apparatus 100b of this second embodiment of the invention, there is the characteristic that, as well as an abnormal state of motor load being detected and escape drive control being carried out, because even if in performing origin position calibration of the moving body position detecting means there is an increase in load resistance this can be escaped and origin calibration carried out without fail, reliability increases.

And there is the effect that, even when a locked/stopped state of the motor arises at the forward limit position or the reverse limit position, temperature increase of the motor and the switching devices driving it can be kept down by unnecessary boosted drive not being carried out and the power supply being stopped swiftly.

Also, there is the characteristic that reliability increases as a result of two sensor systems being used so that with respect to failure of one of them substitution control is possible.

The program memory 161b includes a program constituting the origin-storing processing means 600, and the origin-storing processing means 600 is made up of first and second provisional storing means, comparative determining means and saving means.

The first provisional storing means 615, 645 are means for reading and storing the value of the variable resistance 120 as of when the locked state detecting means 611, 641 detect a locked state of the motor 110 as the moving body 111 is being driven in the reverse direction.

The second provisional storing means 625 are means for reading and storing the value of the variable resistance 120 as of when the locked state detecting means 621 detect a locked state of the motor 110 as the moving body 111 is being driven in the forward direction.

The comparative determining means 630, 650 are means for comparing whether or not the value of the difference between the first and second provisionally stored values and a set value relating to an overall movement distance stored in the program memory 161b or the data memory 162b are substantially the same.

The saving means 656 are means for, when the comparison result of the comparative determining means 630, 650 is that the values are substantially the same, transferring the first and second provisionally stored values to the data memory 162b as a reverse limit position and a forward limit position.

Accordingly, there is the characteristic that even when the relationship between the mounting position of the variable resistance and the position of the moving body is uncertain, by calibration processing pertaining to the device actually mounted it is possible to measure the position of the moving body exactly.

In particular, there is the characteristic that when due to an abnormal increase in the encountered load resistance the moving body has not moved normally, this can be detected and calibration carried out with certainty by the calibration operation being carried out again.

The program memory 161b includes a program constituting the origin-setting processing means 600, and this origin-setting processing means 600 is made up of resetting means, comparative determining means and saving means.

The resetting means 615, 655 are means for initializing the present value of the reversible timer 131 when the locked state detecting means 611, 641 detect a locked state of the motor 110 as the moving body 111 is driven in the reverse direction.

The comparative determining means 630, 650 are means for reading out the present count value of the reversible timer 131 as of when the locked state detecting means 621 detects a locked state of the motor 110 as the moving body 111 is driven in the forward direction and comparing it with a set value relating to an overall movement distance held in the program memory 161b or the data memory 162b.

The saving means 656 are means that become effective when the comparison result of the comparative determining means 630, 650 is that the compared values are the same, and transfer to the data memory at least one of flag information showing that origin-setting processing has completed and a present count value of the reversible timer 131.

Accordingly, there is the characteristic that it is possible to perform initialization of the reversible counter with certainty, and when due to an abnormal increase in the load resistance the moving body has not moved normally it is possible to perform the calibration operation again and carry out initialization without fail.

The origin-storing processing means 600 is executed when the vehicle-mounted drive control apparatus 100b is assembled to the vehicle, the vehicle-mounted drive control apparatus 100b is supplied with power from the vehicle battery 101 by way of a power supply relay 103 that is urged by way of a power supply switch 102 and makes a delayed return when the power supply switch 102 is turned off, and the program memory 161b includes a program constituting the origin-storing/confirming means 914.

The origin-storing/confirming means 914 operates in the period from when the power supply switch 102 is opened to when the power supply relay 103 is cut, and is means for executing a program constituting the origin-storing processing means 600 and, when there is an error between the saved information newly obtained and saved information already held in the data memory 162b, updating the content of the data memory 162b to the new saved information.

Accordingly, there is the characteristic that even when an abnormality arises in the stored calibration information, because updating of the origin information can be carried out with the power supply switch turned off, safety is increased, and the number of re-writings to the nonvolatile data memory can be kept down.

The locked state detecting means 920b is driven by the normal drive control means 907 and detects a locked state when the voltage needed to supply a fixed current falls and the duty ratio $\gamma$ in the pulse width modulation control falls to below a predetermined value.

Accordingly, there is the characteristic that even when the variable resistance or the rotation sensor fails, it is possible to detect a locked/stopped state of the motor without fail and prevent burnout of the motor and the switching devices for driving it.

The locked state detecting means 920b detects a locked state on the basis that the generated pulse of the rotation sensor has not changed for a predetermined time even though power is being supplied to the motor 110.

Accordingly, there is the characteristic that a locked/stopped state of the motor 110 can be detected simply without depending on voltage/current monitoring of the motor 110.

The escape drive control means 825 is either boosted drive means 819a for controlling a duty ratio $\gamma$ of the switching devices and performing feedback control so that the motor current Im of the motor 110 approaches a predetermined escape drive current Ie greater than the rated current of the motor 110, or boosted drive means 819b for making a duty ratio $\beta$ of the switching devices a fixed value irrespective of the speed of the motor 110 and performing limit control of the duty ratio $\beta$ of the switching devices so that a predetermined escape drive current Ie greater than the rated current is supplied to the motor 110 in a locked state.

Accordingly, there is the characteristic that by holding the escape drive current at a fixed value it is possible to obtain a stable escape drive torque even when the power supply voltage fluctuates.

The escape detecting means 820 either detect that the duty ratio $\gamma$ of the switching devices being feedback controlled by the escape drive control means 825 so as to provide a fixed escape current has risen above a predetermined value, or detect that the motor current of the motor has fallen below a predetermined value when a duty ratio $\beta$ of the switching devices is being controlled so that the escape current in the locked state assumes a predetermined value.

Accordingly, there is the characteristic that it is possible to detect that the motor is starting to rotate without fail, without monitoring output changes of the variable resistance or the rotation sensor.

The escape detecting means 820 detects that the logic level of the rotation pulse has changed.

Accordingly, there is the characteristic that it is possible to detect that the motor is starting to rotate simply, without depending on voltage/current monitoring of the motor.

The escape drive control means 921 has opposite drive means 963 that acts when the escape detecting means 924b cannot detect an escaped state even when escape drive has been carried out for a predetermined time.

The opposite drive means 963 is means for reversing the rotation direction of the motor 110 for a range of a predetermined time or up to a predetermined amount of rotation, before starting driving toward the target position again.

Accordingly, there is the characteristic that by movement to the target position being carried out again after escape drive is interrupted and opposite drive is temporarily carried out, a possibility of escape drive, which had been difficult, being achieved, arises, and it is possible to shorten the escape drive time and prevent burnout of the switching devices for driving and the motor.

The escape drive control means 921 has failure notification means 965 which operates when the escape detecting means 924b cannot detect an escaped state even when escape drive is carried out for longer than a predetermined time and stops the supply of power to the motor 110 and operates a warning display 140, and records as failure history information in the data memory 162b that a failure notification has been carried out.

Accordingly, there is the characteristic that burning out of the switching devices and the motor 110 can be prevented, and not only are failures reported but also history information for maintenance checks can be obtained.

What is claimed is:

1. A vehicle-mounted drive control apparatus for drive-controlling a motor that is supplied with reversible electrical power from a vehicle battery by way of switching devices of a driving circuit and reversibly drives a moving body between a forward limit position and a reverse limit position, the drive control apparatus comprising a microprocessor that cooperates with a nonvolatile program memory and a nonvolatile data memory and a RAM memory for processing and also comprising moving body position detecting means, normal drive control means, motor locked state detecting means, escape drive control means, and escape detecting means, wherein:
   the moving body position detecting means are means for performing calibration at an origin position in relation to the output voltage of a variable resistance linked to the rotation of the motor or the present value of a reversible counter reversibly counting pulses from a rotation sensor and detecting the relative position of the moving body with respect to the forward limit position and the reverse limit position by monitoring the value of at least one or the other of the output voltage of the variable resistance and the present value of the reversible counter;
   the normal drive control means are either voltage control means for controlling a duty ratio of the switching devices so that the voltage impressed on the motor is substantially constant even when the power supply voltage of the vehicle battery fluctuates, or current control means for controlling the duty ratio of the switching devices so that the current supplied to the motor detected by a current detecting circuit is substantially constant even when the power supply voltage of the vehicle battery fluctuates;
   the locked state detecting means are means for detecting that the motor is in a non-rotating state even though power is being supplied to it;
   the escape drive control means are intermittent drive means for, acting when the moving body position detecting means is detecting a position other than the forward limit position and the reverse limit position and the motor locked state detecting means is detecting a locked state of the motor, setting a boosted drive period in which the duty ratio of the switching devices is controlled to pass a predetermined escape drive current greater than the rated current of the motor and a rest period in which the duty ratio of the switching devices is controlled to pass a holding current less than the rated current of the motor or to make the current value 0, and repeating the boosted drive period and the rest period over a range up to a predetermined number of times; and
   the escape detecting means are means for detecting that the motor being driven by the escape drive control means has started rotating, and shifting to the normal drive control means.

2. A vehicle-mounted drive control apparatus according to claim 1, wherein the program memory contains a program constituting origin-storing processing means, the origin-storing processing means is made up of first and second provisional storing means, comparative determining means and saving means, the first provisional storing means is means for reading out and storing the value of the variable resistance as of when the locked state detecting means detects a locked state of the motor as the moving body is driven in the reverse direction, the second provisional storing means is means for reading out and storing the value of the variable resistance as of when the locked state detecting means detects a locked state of the motor as the moving body is being driven in the forward direction, the comparative determining means is means for comparing whether or not the difference between the first and second provisionally stored values and a set value relating to an overall movement distance held in the program memory or the data memory are substantially the same, and the saving means are means for, when the comparison result of the comparative determining means is that the values compared are substantially the same, transferring the first and second provisional values to the data memory as the reverse limit position and the forward limit position.

3. A vehicle-mounted drive control apparatus according to claim 1, wherein the program memory contains a program constituting origin-storing processing means, the origin-storing processing means is made up of resetting means, comparative determining means and saving means, the resetting means is means for initializing the present value of the reversible counter when the locked state detecting means detects a locked state of the motor as the moving body is being driven in the reverse direction, the comparative determining means is means for reading out the present count value of the reversible counter when the locked state detecting means detects a locked state of the motor as the moving body is being driven in the forward direction and comparing whether or not it is substantially the same as a set value relating to an overall movement distance held in the program memory or the data memory, and the saving means are means that become effective when the comparison result of the comparative determining means is that the values compared are substantially the same and transfer to the data memory at least one of flag information showing that origin-setting processing has completed and a present count value of the reversible timer.

4. A vehicle-mounted drive control apparatus according to claim 2, wherein the origin-storing processing means is executed when the vehicle-mounted drive control apparatus is assembled to a vehicle and the vehicle-mounted drive control apparatus is supplied with power from the vehicle battery by way of a power supply relay that is urged by a power supply switch and makes a delayed return when the power supply switch is turned off, the program memory contains a program constituting origin-storing/confirming means, and the origin-storing/confirming means are means for, acting in the period of from when the power supply switch is turned off to when the power supply relay is cut, executing the program constituting the origin-storing processing means and, when there is an error between the saved information newly obtained and the saved information already held in the data memory, updating the content of the data memory to the new saved information.

5. A vehicle-mounted drive control apparatus according to claim 3, wherein the origin-storing processing means is executed when the vehicle-mounted drive control apparatus is assembled to a vehicle and the vehicle-mounted drive control apparatus is supplied with power from the vehicle battery by way of a power supply relay that is urged by a power supply switch and makes a delayed return when the power supply switch is turned off, the program memory contains a program constituting origin-storing/confirming means, and the origin-storing/confirming means are means for, acting in the period of from when the power supply switch is turned off to when the power supply relay is cut, executing the program constituting the origin-storing processing means and, when there is an error between the saved information newly obtained and the saved information already held in the data memory, updating the content of the data memory to the new saved information.

6. A vehicle-mounted drive control apparatus according to claim 1, wherein the locked state detecting means detects that the motor is in a locked state when the current being supplied to the motor driven by the normal drive control means and having a fixed voltage impressed upon it becomes excessive to above a predetermined value or when the voltage needed to supply a fixed current falls and a duty ratio in pulse width modulation control falls below a predetermined value.

7. A vehicle-mounted drive control apparatus according to claim 1, wherein the locked state detecting means detects a locked state when notwithstanding that power is being supplied to the motor the output voltage of the variable resistance is not changing or the logic level of the pulse generated by the rotation sensor does not change for a predetermined time.

8. A vehicle-mounted drive control apparatus according to claim 1, wherein the escape drive control means is boosted drive means that controls the duty ratio of the switching devices and performs feedback-control so that the motor current through the motor approaches a predetermined escape drive current greater than the rated current of the motor or boosted drive means that performs limit control of the duty ratio of the switching devices so that the duty ratio of the switching devices is made a fixed value irrespective of the speed of the motor and a predetermined escape drive current greater than the rated current of the motor is supplied to the motor in the locked state.

9. A vehicle-mounted drive control apparatus according to claim 8, wherein the escape detecting are means that detect when the duty ratio of the switching devices being feedback-controlled to a fixed escape current by the escape drive control means has risen, or means that detect when the motor current of the motor has fallen below a predetermined value while the duty ratio of the switching devices is being controlled so that an escape current in the locked state approaches a predetermined value.

10. A vehicle-mounted drive control apparatus according to claim 1, wherein the escape detecting means detects that the output voltage of the variable resistance is changing or the logic level of the rotation pulse is changing.

11. A vehicle-mounted drive control apparatus according to claim 1, wherein the escape drive control means comprises opposite drive means that acts when the escape detecting means cannot detect an escaped state even when escape drive has been carried out for a predetermined time, and the opposite drive means are means for reversing the rotation direction of the motor for a predetermined time or up to a predetermined amount of rotation before restarting driving toward the target position.

12. A vehicle-mounted drive control apparatus according to claim 1, wherein the escape drive control means comprises failure notification means for, acting when the escape detecting means cannot detect an escaped state even when escape drive has been carried out for a predetermined time, stopping the supply of power to the motor and operating a warning/display, and records that a failure notification has been made as failure history information saved to the data memory.

13. A vehicle-mounted drive control apparatus for drive-controlling a motor that is supplied with reversible electrical power from a vehicle battery by way of switching devices of a driving circuit and reversibly drives a moving body between a forward limit position and a reverse limit position, the drive control apparatus comprising a microprocessor that cooperates with a nonvolatile program memory and a nonvolatile data memory and a RAM memory for processing and also comprising moving body position detecting means, good source selecting means, normal drive control means, motor locked state detecting means, escape drive control means, and escape detecting means, wherein:

the moving body position detecting means are means for performing calibration at an origin position in relation to the output voltage of a variable resistance linked to the rotation of the motor or the present value of a reversible counter reversibly counting pulses from a rotation sensor and detecting the relative position of the moving body with respect to the forward limit position and the reverse limit position by monitoring the value of at least one or the other of the output voltage of the variable resistance and the present value of the reversible counter;

the good source selecting means have first failure detecting means for detecting any defective contact of the variable resistance or wire-break or short-circuit of its wiring, second failure detecting means for detecting any wire-break or short-circuit of internal or external wiring of the rotation sensor, and relative comparing means for determining whether or not a value proportional to a change in the output voltage of the variable resistance and a change of the present value of the reversible counter are substantially the same, and when the determination of the relative comparing means is that they are not the same and one of the first and second failure detecting means is detecting an abnormal state the other source not being detected as abnormal is selected as a good source, and when the relative comparing means determines that they are not the same but the first and second failure detecting means are both detecting a normal state it determines that there is no good source, and the moving body position detecting means detects the position of the moving body relative to the forward limit position and the reverse limit position on the basis of a variable resistance or rotation sensor determined to be a good source;

the normal drive control means are either voltage control means for controlling a duty ratio of the switching devices so that the voltage impressed on the motor is substantially constant even when the power supply voltage of the vehicle battery fluctuates, or current control means for controlling the duty ratio of the switching devices so that the current supplied to the motor detected by a current detecting circuit is substantially constant even when the power supply voltage of the vehicle battery fluctuates;

the locked state detecting means are means for detecting that the motor is in a non-rotating state even though power is being supplied to it;

the escape drive control means are means for, acting when the moving body position detecting means is detecting a position other than the forward limit position and the reverse limit position and the motor locked state detecting means is detecting a locked state of the motor, controlling a duty ratio of the switching devices to continuously or intermittently pass a predetermined escape drive current above the rated current of the motor for a period of up to a predetermined time; and the escape detecting means are means for detecting that the motor being driven by the escape drive control means has started rotating, and shifting to the normal drive control means.

14. A vehicle-mounted drive control apparatus according to claim 13, wherein the program memory contains a program constituting origin-storing processing means, the origin-storing processing means is made up of first and second provisional storing means, comparative determining means and saving means, the first provisional storing means is means for reading out and storing the value of the variable resistance as of when the locked state detecting means detects a locked state of the motor as the moving body is driven in the reverse direction, the second provisional storing means is means for reading out and storing the value of the variable resistance as of when the locked state detecting means detects a locked state of the motor as the moving body is being driven in the forward direction, the comparative determining means is means for comparing whether or not the difference between the first and second provisionally stored values and a set value relating to an overall movement distance held in the program memory or the data memory are substantially the same, and the saving means are means for, when the comparison result of the comparative determining means is that the values compared are substantially the same, transferring the first and second provisional values to the data memory as the reverse limit position and the forward limit position.

15. A vehicle-mounted drive control apparatus according to claim 13, wherein the program memory contains a program constituting origin-storing processing means, the origin-storing processing means is made up of resetting means, comparative determining means and saving means, the resetting means is means for initializing the present value of the reversible counter when the locked state detecting means detects a locked state of the motor as the moving body is being driven in the reverse direction, the comparative determining means is means for reading out the present count value of the reversible counter when the locked state detecting means detects a locked state of the motor as the moving body is being driven in the forward direction and comparing whether or not it is substantially the same as a set value relating to an overall movement distance held in the program memory or the data memory, and the saving means are means that become effective when the comparison result of the comparative determining means is that the values compared are substantially the same and transfer to the data memory at least one of flag information showing that origin-setting processing has completed and a present count value of the reversible timer.

16. A vehicle-mounted drive control apparatus according to claim 14, wherein the origin-storing processing means is executed when the vehicle-mounted drive control apparatus is assembled to a vehicle and the vehicle-mounted drive control apparatus is supplied with power from the vehicle battery by way of a power supply relay that is urged by a power supply switch and makes a delayed return when the power supply switch is turned off, the program memory contains a program constituting origin-storing/confirming means, and the origin-storing/confirming means are means for, acting in the period of from when the power supply switch is turned off to when the power supply relay is cut, executing the program constituting the origin-storing processing means and, when there is an error between the saved information newly obtained and the saved information already held in the data memory, updating the content of the data memory to the new saved information.

17. A vehicle-mounted drive control apparatus according to claim 15, wherein the origin-storing processing means is executed when the vehicle-mounted drive control apparatus is assembled to a vehicle and the vehicle-mounted drive control apparatus is supplied with power from the vehicle battery by way of a power supply relay that is urged by a power supply switch and makes a delayed return when the power supply switch is turned off, the program memory contains a program constituting origin-storing/confirming means, and the origin-storing/confirming means are means for, acting in the period of from when the power supply switch is turned off to when the power supply relay is cut, executing the program constituting the origin-storing processing means and, when there is an error between the saved information newly obtained and the saved information already held in the data memory, updating the content of the data memory to the new saved information.

18. A vehicle-mounted drive control apparatus according to claim 13, wherein the locked state detecting means detects that the motor is in a locked state when the current being supplied to the motor driven by the normal drive control means and having a fixed voltage impressed upon it becomes excessive to above a predetermined value or when the voltage needed to supply a fixed current falls and a duty ratio in pulse width modulation control falls below a predetermined value.

19. A vehicle-mounted drive control apparatus according to claim 13, wherein the locked state detecting means detects a locked state when notwithstanding that power is being supplied to the motor the output voltage of the variable resistance is not changing or the logic level of the pulse generated by the rotation sensor does not change for a predetermined time.

20. A vehicle-mounted drive control apparatus according to claim 13, wherein the escape drive control means is boosted drive means that controls the duty ratio of the switching devices and performs feedback-control so that the motor current through the motor approaches a predetermined escape drive current greater than the rated current of the motor or boosted drive means that performs limit control of the duty ratio of the switching devices so that the duty ratio of the switching devices is made a fixed value irrespective of the speed of the motor and a predetermined escape drive current greater than the rated current of the motor is supplied to the motor in the locked state.

21. A vehicle-mounted drive control apparatus according to claim 20, wherein the escape detecting are means that detect when the duty ratio of the switching devices being feedback-controlled to a fixed escape current by the escape drive control means has risen, or means that detect when the motor current of the motor has fallen below a predetermined value while the duty ratio of the switching devices is being controlled so that an escape current in the locked state approaches a predetermined value.

22. A vehicle-mounted drive control apparatus according to claim 13, wherein the escape detecting means detects that the output voltage of the variable resistance is changing or the logic level of the rotation pulse is changing.

23. A vehicle-mounted drive control apparatus according to claim 13, wherein the escape drive control means comprises opposite drive means that acts when the escape detecting means cannot detect an escaped state even when escape drive has been carried out for a predetermined time, and the opposite drive means are means for reversing the rotation direction of the motor for a predetermined time or up to a predetermined amount of rotation before restarting driving toward the target position.

24. A vehicle-mounted drive control apparatus according to claim 13, wherein the escape drive control means comprises failure notification means for, acting when the escape detecting means cannot detect an escaped state even when escape drive has been carried out for a predetermined time, stopping the supply of power to the motor and operating a warning/display, and records that a failure notification has been made as failure history information saved to the data memory.

* * * * *